US011599730B2

(12) United States Patent
Wu et al.

(10) Patent No.: US 11,599,730 B2
(45) Date of Patent: Mar. 7, 2023

(54) LEARNING DIALOGUE STATE TRACKING WITH LIMITED LABELED DATA

(71) Applicant: salesforce.com, inc., San Francisco, CA (US)

(72) Inventors: Chien-Sheng Wu, Singapore (SG); Chu Hong Hoi, Singapore (SG); Caiming Xiong, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 460 days.

(21) Appl. No.: 16/870,568

(22) Filed: May 8, 2020

(65) Prior Publication Data

US 2021/0174026 A1 Jun. 10, 2021

Related U.S. Application Data

(60) Provisional application No. 62/945,792, filed on Dec. 9, 2019.

(51) Int. Cl.
| | |
|---|---|
| *G06F 17/00* | (2019.01) |
| *G06F 40/35* | (2020.01) |
| *G06N 5/04* | (2023.01) |
| *G06N 3/08* | (2023.01) |
| *G06K 9/62* | (2022.01) |
| *G10L 15/16* | (2006.01) |
| *G10L 15/22* | (2006.01) |
| *G10L 15/30* | (2013.01) |

(52) U.S. Cl.
CPC .......... *G06F 40/35* (2020.01); *G06K 9/6257* (2013.01); *G06N 3/08* (2013.01); *G06N 5/04* (2013.01); *G10L 15/16* (2013.01); *G10L 15/22* (2013.01); *G10L 15/30* (2013.01)

(58) Field of Classification Search
CPC ......... G10L 15/30; G10L 15/22; G10L 15/16; G06N 5/04; G06N 3/08; G06N 3/0454; G06N 3/0445; G06K 9/6257; G06F 40/35
USPC ............................................................ 704/9
See application file for complete search history.

(56) References Cited

U.S. PATENT DOCUMENTS

| | | | |
|---|---|---|---|
| 10,282,663 | B2 | 5/2019 | Socher et al. |
| 10,346,721 | B2 | 7/2019 | Albright et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,546,217 | B2 | 1/2020 | Albright et al. |
| 10,558,750 | B2 | 2/2020 | Lu et al. |
| 10,565,305 | B2 | 2/2020 | Lu et al. |
| 10,565,306 | B2 | 2/2020 | Lu et al. |
| 10,565,318 | B2 | 2/2020 | Bradbury |

(Continued)

OTHER PUBLICATIONS

Barlow, "Unsupervised Learning," Neural Computation, 1(3):295-311, 1989.

(Continued)

*Primary Examiner* — Paul C McCord
(74) *Attorney, Agent, or Firm* — Haynes and Boone LLP

(57) ABSTRACT

Embodiments described in this disclosure illustrate the use of self-/semi supervised approaches for label-efficient DST in task-oriented dialogue systems. Conversational behavior is modeled by next response generation and turn utterance generation tasks. Prediction consistency is strengthened by augmenting data with stochastic word dropout and label guessing. Experimental results show that by exploiting self-supervision the joint goal accuracy can be boosted with limited labeled data.

20 Claims, 16 Drawing Sheets

(56) References Cited

U.S. PATENT DOCUMENTS

| | | |
|---|---|---|
| 10,565,493 B2 | 2/2020 | Merity et al. |
| 10,573,295 B2 | 2/2020 | Zhou et al. |
| 10,592,767 B2 | 3/2020 | Trott et al. |
| 2015/0095033 A1 | 4/2015 | Boies et al. |
| 2016/0350653 A1 | 12/2016 | Socher et al. |
| 2017/0024645 A1 | 1/2017 | Socher et al. |
| 2017/0032280 A1 | 2/2017 | Socher |
| 2017/0091171 A1 | 3/2017 | Perez |
| 2017/0140240 A1 | 5/2017 | Socher |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0268287 A1 | 9/2018 | Johansen et al. |
| 2018/0268298 A1 | 9/2018 | Johansen et al. |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0355270 A1 | 11/2019 | McCann et al. |
| 2019/0362020 A1 | 11/2019 | Paulus et al. |
| 2019/0362246 A1 | 11/2019 | Lin et al. |
| 2020/0005765 A1 | 1/2020 | Zhou et al. |
| 2020/0057805 A1 | 2/2020 | Lu et al. |
| 2020/0065651 A1 | 2/2020 | Merity et al. |
| 2020/0084465 A1 | 3/2020 | Zhou et al. |
| 2020/0089757 A1 | 3/2020 | Machado et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |

OTHER PUBLICATIONS

Berthelot et al., "Mixmatch: A Holistic Approach to Semi-Supervised Learning," arXiv:1905.02249, pp. 1-14, 2019.

Budzianowski et al., "MultiWOZ—A Large-scale Multi-domain Wizard-of-Oz Dataset for Task-oriented Dialogue Modelling," In Proceedings of the 2018 Conference on Empirical Methods in Natural Language Processing. pp. 5016-5026, Brussels, Belgium. Oct.-Nov. 2018. Association for Computational Linguistics, doi: 10.18653/v1/D18-1547. URL https://www.aclweb.org/anthology/D18-1547.

Chao et al., "BERT-DST: Scalable End-to-End Dialogue State Tracking with Bidirectional Encoder Representations from Transformer," arXiv:1907.03040, pp. 1-5, 2019.

Chapelle et al., Semi-Supervised Learning (Chapelle et al., eds.; 2006) [book reviews], IEEE Transactions on Neural Networks, 20(3):542-542, 2009.

Devlin et al, "BERT: Pre-Training of Deep Bidirectional Transformers for Language Understanding," In Proceedings of the 2019 NAACL-HLT, vol. 1 (Long and Short Papaers), pp. 4171-4186, Minneapolis, Minnesota, Jun. 2-Jun. 7, 2019.

Eric et al., "MultiWOZ 2.1: Multi-domain Dialogue State Corrections and State Tracking Baselines," arXiv:1907.01669, pp. 1-7, 2019.

Gao et al., "Dialog State Tracking: A Neural Reading Comprehension Approach," arXiv:1908.01946, pp. 1-10, 2019.

Goel et al., "Hyst: A Hybrid Approach for Flexible and Accurate Dialogue State Tracking," arXiv: 1907.00883, pp. 1-5, 2019.

Grandvalet et al., "Semi-Supervised Learning by Entropy Minimization," In Advances in Neural Information Processing Systems, pp. 529-536, 2005.

Hashimoto et al., "A Joint Many-Task Model: Growing a Neural Network for Multiple NPL Tasks" 2017 Conference on Empirical Methods in Natural Language Processing (EMNLP 2017), (Jul. 24, 2017) pp. 1-15, arXiv:1611.01587v5.

Henderson et al., "Word-Based Dialog State Tracking with Recurrent Neural Networks," In Proceedings of the 15th Annual Meeting of the Special Interest Group on Discourse and Dialogue (SIGDIAL), pp. 292-299, 2014.

Jin et al., "Explicit State Tracking with Semi-Supervision for Neural Dialogue Generation," In Proceedings of the 27th ACM International Conference on Information and Knowledge Management, pp. 1403-1412, ACM, 2018.

Kingma et al., "Adam: A Method for Stochastic Optimization," In International Conference on Learning Representations, (ICLR), pp. 1-15, 2015.

Lee et al., "SUMBT: Slot-Utterance Matching for Universal and Scalable Belief Tracking," arXiv:190707421, pp. 1-6, 2019.

Mrkšić et al., "Neural Belief Tracker: Data-Driven Dialogue State Tracking," In Proceedings of the 55th Annual Meeting of the Association for Computational Linguistics (vol. 1: Long Papers), pp. 1777-1788, Association for Computational Linguistics, 2017, doi: 10.18653/vl/PI7-1163. URL http://www.aclweb.org/anthology/P17-1163.

Pennington et al., "GloVe: Global Vectors for Word Representation", Proceedings of the 2014 Conference on Empirical Methods in Natural Language Processing (EMNLP), Doha, Qatar, Oct. 25-29, 2014, https://nlp.stanford.edu/pubs/glove.pdf. pp. 1532-1543, pp. 1-12.

Ramadan et al., "Large-Scale Multi-Domain Belief Tracking with Knowledge Sharing," In Proceedings cf the 56th Annual Meeting of the Association for Computational Linguistics, vol. 2, Short Papers, pp. 432-437, 2018.

Rastogi et al., "Scalable Multi-Domain Dialogue State Tracking," IEEE Automatic Speech Recognition and Understanding Workshop (ASRU), pp. 561-568, 2017.

Rastogi et al., "Towards Scalable Multi-domain Conversational Agents: The Schema-Guided Dialogue Dataset," arXiv:1909.05855, 2019, pp. 1-11.

Ren et al., "Scalable and Accurate Dialogue State Tracking via Hierarchical Sequence Generation," arXiv:1909.00754, 2019, pp. 1-10.

Ren et al., "Towards Universal Dialogue State Tracking," In Proceedings of the 2018 Conference on Empirical Methods in Natural Language Processing, pp. 2780-2786, 2018.

Sajjadi et al., "Regularization with Stochastic Transformations and Perturbations for Deep Semi-Supervised Learning," 30th Conference on Neural Information Processing Systems (NIPS 2016), Barcelona, Spain, pp. 1-9.

Sankar et al., "Do Neural Dialog Systems Use the Conversation History Effectively? An Empirical Study," In Proceedings of the 57th Annual Meeting of the Association for Computational Linguistics, pp. 32-37, Florence, Italy, Association for Computational Linguistics.

See et al., "Get to The Point: Summarization with Pointergenerator Networks," In Proceedings of the 55th Annual Meeting of the Association for Computational Linguistics (vol. 1: Long Papers), vol. 1, pp. 1073-1083, Vancouver, Canada, Jul. 30-Aug. 4, 2017.

Shi et al., "Unsupervised Dialog Structure Learning," arXiv:1904.03736v2, pp. 1-11, 2019.

(56) References Cited

OTHER PUBLICATIONS

Thomson et al., "Bayesian Update of Dialogue State: A POMDP Framework for Spoken Dialogue Systems," Computer Speech & Language, 24(4):562-588, 2010.

Tseng et al., "Semi-Supervised Bootstrapping of Dialogue State Trackers for Task-Oriented Modelling," In Proceedings of the 2019 Conference on Empirical Methods in Natural Language Processing and the 9th International Joint Conference on Natural Language Processing (EMNLP-IJCNLP), pp. 1273-1278, Hong Kong, China, Association for Computational Linguistics, 2019.

Wang et al., "A Simple and Generic Belief Tracking Mechanism for the Dialog State Tracking Challenge: On the Believability of Observed Information," In Proceedings of the SIGDIAL 2013 Conference, pp. 423-432, Metz, France, Aug. 22-24, 2013.

Wen et al., "A Network-Based End-to-End Trainable Task-oriented Dialogue System," In Proceedings of the 15th Conference of the European Chapter of the Association for Computational Linguistics: vol. 1, Long Papers, pp. 438-449, Valencia. Spain, Apr. 2017, Association for Computational Linguistics, URL https://www.aclweb.org/anthology/E17-1042.

Williams, "Web-Style Ranking and SLU Combination for Dialog State Tracking," In Proceedings of the 15th Annual Meeting of the Special Interest Group on Discourse and Dialogue (SIGDIAL), pp. 282-291, Philadelphia, U.S.A., Jun. 18-20, 2014.

Williams, "Partially Observable Markov Decision Processes for Spoken Dialog Systems," Computer Speech & Language, 21(2):393-422, 2007.

Wu et al., "Transferable Multi-Domain State Generator for Task-oriented Dialogue Systems," In Proceedings of the 57th Annual Meeting of the Association for Computational Linguistics, pp. 808-819, Florence, Italy, Jul. 2019, Association for Computational Linguistics, URL https://www.aclweb.org/anthology/P19-1078.

Wu et al., "Self-Supervised Dialogue Learning," In Proceedings of the 57th Annual Meeting of the Association for Computational Linguistics, pp. 3857-3867, Florence, Italy, Association for Computational Linguistics, 2019b.

Xu et al., "An End-to-End Approach for Handling Unknown Slot values in Dialogue State Tracking," In Proceedings of the 56th Annual Meeting of the Association for Computational Linguistics (vol. 1: Long Papers), pp. 1448-1457, Association for Computational Linguistics, 2018, URL http://aclweb.org/anthology/P18-1134.

Zhang et al., "Find or Classify? Dual Strategy for Slot-value Predictions on Multi-domain Dialog State Tracking," arXiv:1910.03544v2, 2019, pp. 1-12.

Zhong et al., "Global-Locally Self-Attentive Encoder for Dialogue State Tracking," In Proceedings of the 56th Annual Meeting of the Association for Computational Linguistics (vol. 1: Long Papers), pp. 1458-1467, Melbourne, Australia, Jul. 2018, Association for Computational Linguistics, doi: 10.18653/v1/P18-1135, URL https://www.aclweb.org/anthology/P18-1135.pdf.

Zhou et al., "Learning with Local and Global Consistency," In Advances in Neural Information Processing Systems, pp. 321-328, 2004.

Zilka et al., "Incremental LSTM-Based Dialog State Tracker," In 2015 IEEE Workshop on Automatic Speech Recognition and Understanding (ASRU), pp. 757-762. IEEE, 2015.

Dialog History (100% Data)

hi hello, i am trying to find a train that goes from cambridge to london kings cross . can you help me book a ticket ? ; i can help with that . can you tell me what day will be traveling ? ; i need to leave on saturday after 18:45 . ; the soonest departure time would be at 19:00 on saturday, is that okay ? ; yes, that s perfect . can you book that for 8 people ? ; you are all booked with reference number 144vdbrm . the cost of 151.04 gdp will be payable at the station . can I be of further assistance today ? ; i am looking for an expensive place to eat in the centre , what is there that fits that criteria ? ; there 33 place -s that fit your criteria . do you have a particular cuisine type in mind so that I can narrow the results down ? ; it does not matter what kind of food . what would you recommend for a large group of 8 people ? ; how about don pasquale pizzeria ? ; that sounds great . please book it for 8 on saturday at 14:15 and get a reference number . ; unfortunately, the restaurant does not have a table for that time . can you do it earlier or later ? ; how about 13:15 ? ; great . that was successful . your reference number is q0ij8u6u . ; thank you , you've been a great help . ; is there anything else that I could help you with today ? ; no thank you, that s all for now ! ;

*FIG. 8A*

Dialog History (1% Data w/o Self)

; hi hello, i am trying to find a train that goes from cambridge to london kings cross . can you help me book a ticket ? ; i can help with that . can you tell me what day will be traveling ? ; i need to leave on saturday after 18:45 . ; the soonest departure time would be at 19:00 on saturday, is that okay ? ; yes, that s perfect . can you book that for 8 people ? ; you are all booked with reference number 144vdbrm . the cost of 151.04 gdp will be payable at the station . can I be of further assistance today ? ; i am looking for an expensive place to eat in the centre , what is there that fits that criteria ? ; there 33 place -s that fit your criteria . do you have a particular cuisine type in mind so that I can narrow the results down ? ; it does not matter what kind of food . what would you recommend for a large group of 8 people ? ; how about don pasquale pizzeria ? ; that sounds great . please book it for 8 on saturday at 14:15 and get a reference number . ; unfortunately, the restaurant does not have a table for that time . can you do it earlier or later ? ; how about 13:15 ? ; great . that was successful . your reference number is q0ij8u6u . ; thank you , you've been a great help . ; is there anything else that I could help you with today ? ; no thank you, that s all for now ! ;

*FIG. 8B*

Dialog History

1% Data w/ Self

[]hi ; hello, [i] am trying to find a train that goes from [cambridge] to [london] kings cross . can you help me book a ticket ? ; i can help with that . can you tell me what day will be traveling ? ; i need to leave on [saturday] after [18:45] ; the soonest departure time would be at 19:00 on saturday, is that okay ? ; yes, that s perfect . can you book that for [8] people ? ; you are all booked with reference number 144vdbrm . the cost of 151.04 gdp will be payable at the station . can I be of further assistance today ?[] i am looking for an [expensive] place to eat in the [centre], what is there that fits that criteria ? ; there 33 place -s that fit your criteria . do you have a particular [cuisine] type in mind so that I can narrow the results down ? ; it does not matter what kind of food . what would you recommend for a large group of 8 people ? ; how about don pasquale pizzeria ? ; that sounds great . please book it for [8] on [saturday] at 14:15 and get a reference number . ; unfortunately, the restaurant does not have a table for that time . can you do it earlier or later ? ; how about [13:15]? ; great . that was successful . your reference number is q0ij8u6u . ; thank you , you've been a great help .[] is there anything else that I could help you with today [?]; no thank [you] that s all for now[]

*FIG. 8C*

Dialog History

100% Data

[][hi][I] need a train leaving king s lynn after 13:45 . ; what day will you be traveling ? ; this will be for [wednesday] . ; there is tr9057 which is at 9.80 pounds and takes 47 minutes . will you book that ? ; no that will not be necessary . can you just tell me what the arrival time is ? ; no train leaving [kings] lynn at 13:45 . do you want to change the departure time ? ; i can leave any time after [13:45] going to [cambridge] . will you check the schedule again , please ? ; sorry, there are actually 10 entries here . shall i book 1 for you ?[] just the first departure after 13:45 please , no booking , just the price and arrival time . ; tr8143 will cost 9.80 pounds and arrives by 14:45 . anything else i can do for you ?[] also need to find a place to stay . ; what [area] of town would you like to be in ? ; it doesn't matter[] i just want it to be a [cheap] [guesthouse] with [wifi] included .[] i can recommend the [allenbell]. it s in the east , is cheap yet has a 4 star rating and free wifi and parking . can I help you book ?[] no i just need the phone number . thanks ;

*FIG. 9A*

| | Dialog History |
|---|---|
| 1% Data w/o SSL | ; hi i need a train leaving king s lynn after 13:45 . ; what day will you be traveling ? ; this will be for wednesday . ; there is tr9057 which is at 9.80 pounds and takes 47 minutes . will you book that ? ; no that will not be necessary . can you just tell me what the arrival time is ? ; no train leaving kings lynn at 13:45 . do you want to change the departure time ? ; i can leave any time after 13:45 going to cambridge . will you check the schedule again , please ? ; sorry, there are actually 10 entries here . shall i book 1 for you ? ; just the first departure after 13:45 please , no booking , just the price and arrival time . ; tr8143 will cost 9.80 pounds and arrives by 14:45 . anything else i can do for you ? ; i also need to find a place to stay . ; what area of town would you like to be in ? ; it doesn't matter . i just want it to be a cheap guesthouse with wifi included . ; i can recommend the allenbell . it s in the east , is cheap yet has a 4 star rating and free wifi and parking . can I help you book ? ; no i just need the phone number . thanks ; |

*FIG. 9B*

| | Dialog History |
|---|---|
| 1% Data w/ SSL | hi ; i need a train leaving king s lynn after 13:45 . ; what day will you be traveling ? ; this will be for wednesday . ; there is tr9057 which is at 9.80 pounds and takes 47 minutes . will you book that ? ; no that will not be necessary . can you just tell me what the arrival time is ? ; no train leaving kings lynn at 13:45 . do you want to change the departure time ? ; i can leave any time after 13:45 going to cambridge . will you check the schedule again , please ? ; sorry, there are actually 10 entries here . shall i book 1 for you ? ; just the first departure after 13:45 please , no booking , just the price and arrival time . ; tr8143 will cost 9.80 pounds and arrives by 14:45 . anything else i can do for you ? ; i also need to find a place to stay . ; what area of town would you like to be in ? ; it doesn't matter . i just want it to be a cheap guesthouse with wifi included . ; i can recommend the allenbell . it s in the east , is cheap yet has a 4 star rating and free wifi and parking . can I help you book ? ; no i just need the phone number . thanks ; |

*FIG. 9C*

| | Dialog History |
|---|---|
| 100 % Data | [hi] [hello] , i would [like] to find a hotel that include -s free [parking] . ; most of the [hotel] -s in town offer free parking . is there a certain area you would like to stay in , or do you have a price range in mind ? ; yes . the [centre] would be nice and also free [wifi] . ; the university arms is an expensive , 4 star hotel with free wifi . comparatively , the [alexander] bed and breakfast is a [cheap] -ly priced guesthouse , also 4 stars . ; please book me some rooms for the [university] arms to accommodate [8] people for [3] nights starting on [wednesday] . can you also provide me the reference number after you book ? ; your reference number is x5ny66zv . ; thank you . can you please help me find a place to go in town in the same area as the hotel ? preferably a college . ; there are no colleges close to the area you are requesting , would you like to chose another destination ? ; i believe there are some colleges in the centre of town . can you please check again ? ; i am sorry but i rechecked and there are no colleges in that area . is there anything else that i can do for you ? ; hmmm , i was looking for the phone number and postcode of a college in the [centre] area . could you help me with that ? ; i have 5 colleges in the centre area . what specific college are you looking for ? ; i am looking for cambridge . ; i am sorry , there are no listings for [cambridge] college in the centre area . is there another college you would like me to look for ? ; oh , it could be anyone then . just a [college] . ; |

FIG. 10A

| | Dialog History |
|---|---|
| 1% Data w/o SSL | ; hi [ ] hello , i would like to find a hotel that include -s free parking . ; most of the hotel -s in town offer free parking . is there a certain area you would like to stay in , or do you have a price range in mind ? ; yes . the centre would be nice and also free [wifi] . ; the university arms is an expensive , 4 star hotel with free wifi . comparatively , the alexander bed and breakfast is a cheap -ly priced guesthouse , also 4 stars . ; please book me some [rooms] for the university arms to accommodate 8 people for 3 [nights] starting on wednesday . can you [also] provide me the reference number after you book ? ; your reference number is x5ny66zv . ; thank you . can you please help me find a place to go in town in the same area as the hotel ? preferably a college . ; there are no colleges close to the area you are requesting , would you like to chose another destination ? ; i believe there are some colleges in the centre of town . can you please check again ? ; i am sorry but i rechecked and there are no colleges in that area . is there anything else that i can do for you ? ; hmmm , i was looking for the phone number and postcode of a college in the centre area . could you help me with that ? ; i have 5 colleges in the centre area . what specific college are you looking for ? ; i am looking for cambridge . ; i am sorry , there are no listings for cambridge college in the centre area . is there another college you would like me to look for ? ; oh , it could be anyone then . just a college . ; |

FIG. 10B

| Dialog History |
|---|
| 1% Data w/ SSL · [*] hi ; hello , i would like to find a [hotel] that include -s free parking . ; most of the hotel -s in town [offer] [free] parking . is there a certain area [you] would like to stay in , or do you have a price range in mind ? ; yes . the [centre] would be nice and also [free] wifi . ; the university arms is an expensive , 4 star [hotel] with free wifi . comparatively , the [alexander] bed and breakfast is a [cheap] -ly priced guesthouse , also [4] stars . ; please book me some rooms for the university arms to accommodate [8] people for [3] nights starting on [wednesday] . can you also provide me the reference number after you book ? ; your reference number is x5ny66zv . [.] thank you . can you please help me find a place to go in town in the same area as the hotel ? preferably a college . ; there are no colleges close to the area you are requesting , would you like to chose another destination ? ; i believe there are some colleges in the [centre] of town . can you please check again ? ; i am sorry but i rechecked and there are no colleges in that area . is there anything else that i can do for you ? ; hmmm , i was looking for the phone number and postcode of a college in the centre area . could [you] help me with that ? ; i have 5 colleges in the [centre] area . what specific college are you looking for ? ; [i] am looking for cambridge . ; i am sorry , there are no listings for cambridge college in the centre area . is there another [college] [you] would like me to look for [?] oh , it could be anyone then . just a [college] . ; |

FIG. 10C

| | Dialog History |
|---|---|
| 100% Data | hi, i need to take a train from cambridge , i need to arrive at my destination by 17:00 and ; okay , what day did you have in mind ? ; i would like to leave on saturday . ; what station would you like to arrive at ? ; i need to get to norwich please . ; |
| 1% Data w/o SSL | ; hi, i need to take a train from cambridge , i need to arrive at my destination by 17:00 and ; okay , what day did you have in mind ? ; i would like to leave on saturday . ; what station would you like to arrive at ? ; i need to get to norwich please . ; |
| 1% Data w/ SSL | hi ; i need to take a train from cambridge , i need to arrive at my destination by 17:00 and ; okay , what day did you have in mind ? ; i would like to leave on saturday . ; what station would you like to arrive at ? ; i need to get to norwich please . ; |

FIG. 11

| | Dialog History |
|---|---|
| 100 % Data | ; hi ; hey i am looking for a train from cambridge to bishops stortford . mind helping out ? ; many trains are leaving on friday . mind choosing the time ? ; i want to leave on monday and arrive by 18:45 . ; i have train tr4283 that leaves cambridge at 5:29 and arrives in bishops stortford at 6:07 . would you like to make reservations ? ; could you give me the travel time and price of that train please ? ; the cost is 10.10 pounds . the duration of the trip is 38 minutes , leaving cambridge at 5:29 and arriving at 6:07 in bishops stortford . ; i also want a cheap chinese restaurant . ; there are 4 great restaurant -s to choose from . do you prefer 1 on the south side of town or in the centre ? ; i would like to be in the centre please . ; i recommend charlie chan . would you like to reserve a table ? ; yes . monday , 8 people , 10:30 . ; |
| 1% Data w/o SSL | ; hi ; hey i am looking for a train from cambridge to bishops stortford . mind helping out ? ; many trains are leaving on friday . mind choosing the time ? ; i want to leave on monday and arrive by 18:45 . ; i have train tr4283 that leaves cambridge at 5:29 and arrives in bishops stortford at 6:07 . would you like to make reservations ? ; could you give me the travel time and price of that train please ? ; the cost is 10.10 pounds . the duration of the trip is 38 minutes , leaving cambridge at 5:29 and arriving at 6:07 in bishops stortford . ; i also want a cheap chinese restaurant . ; there are 4 great restaurant -s to choose from . do you prefer 1 on the south side of town or in the centre ? ; i would like to be in the centre please . ; i recommend charlie chan . would you like to reserve a table ? ; yes . monday , 8 people , 10:30 . ; |
| 1% Data w/ SSL | ; hi ; hey i am looking for a train from cambridge to bishops stortford . mind helping out ? ; many trains are leaving on friday . mind choosing the time ? ; i want to leave on monday and arrive by 18:45 . ; i have train tr4283 that leaves cambridge at 5:29 and arrives in bishops stortford at 6:07 . would you like to make reservations ? ; could you give me the travel time and price of that train please ? ; the cost is 10.10 pounds . the duration of the trip is 38 minutes , leaving cambridge at 5:29 and arriving at 6:07 in bishops stortford . ; i also want a cheap chinese restaurant . ; there are 4 great restaurant -s to choose from . do you prefer 1 on the south side of town or in the centre ? ; i would like to be in the centre please . ; i recommend charlie chan . would you like to reserve a table ? ; yes . monday , 8 people , 10:30 . ; |

FIG. 12

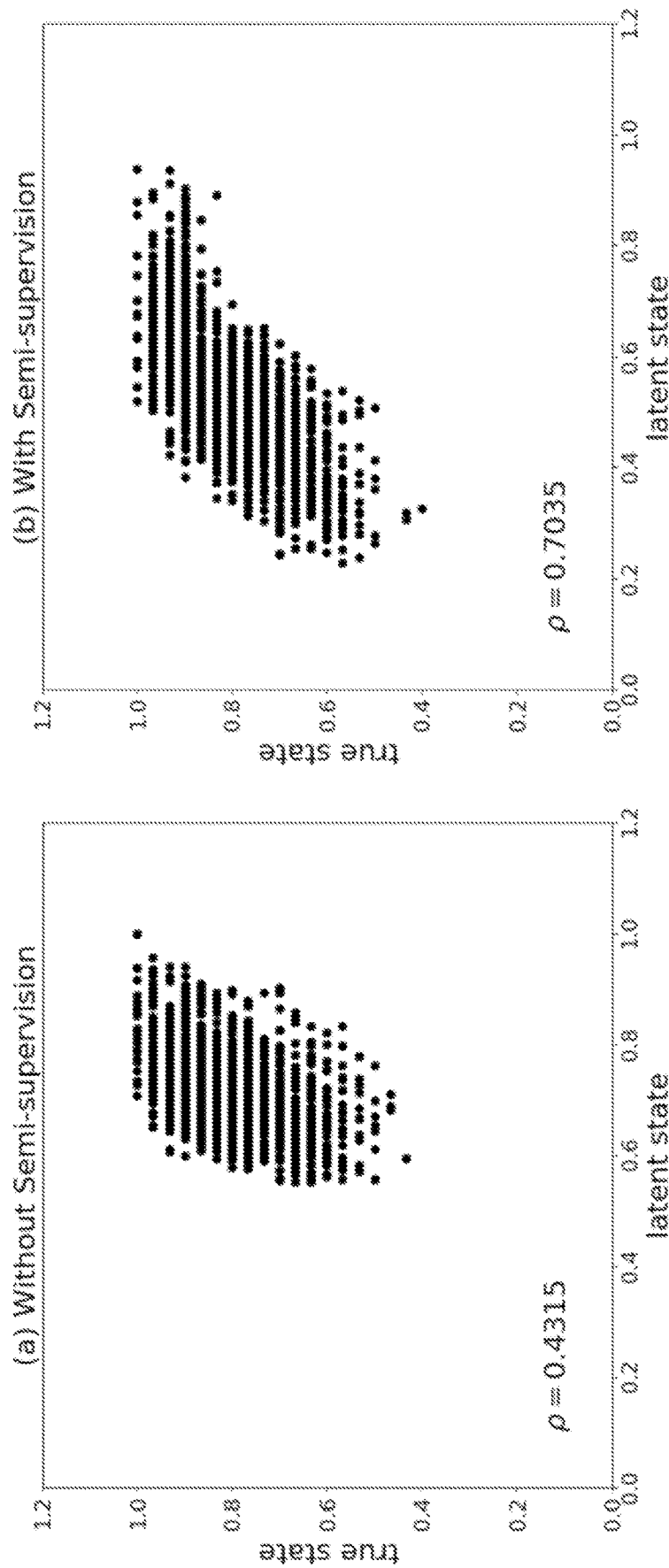

LEARNING DIALOGUE STATE TRACKING WITH LIMITED LABELED DATA

RELATED APPLICATIONS

This application claims priority to U.S. Provisional Patent Application No. 62/945,792, filed Dec. 9, 2019, which is incorporated by reference herein in its entirety.

This application is related to co-pending and commonly-owned U.S. Nonprovisional application Ser. No. 16/870,571 filed on May 8, 2022, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to learning dialogue state tracking with limited labeled data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Neural networks have been used to generate conversational responses and thus conduct a dialogue with a human user. Specifically, a task-oriented dialogue system can be used to understand user requests, ask for clarification, provide related information, and take actions. For example, a human user can engage in a dialogue with the task-oriented system to make restaurant reservations, find places of interest, help with navigation or driving directions, etc. To conduct such task-oriented dialogues, a dialogue state tracking (DST) model is usually used for tracking the intentions of users, retrieving information from external databases, and planning for multi-turn conversations.

Existing artificial intelligence (AI) systems often use a large amount of supervised dialogue data, e.g., historical dialogues with annotated state labels, to train the DST model. However, collecting dialogue state labels can be rather expensive and time-consuming, often requiring dialogue experts or trained personnel to manually identify the domain, slot and value for each turn in the dialogues. In particular, when dialogues for training expand from a single domain to multiple domains, the excessive annotation required to enlarge the training dataset renders the DST model largely unscalable. This inconvenient training process may delay or even prohibit prompt updates of the DST model and thus leads to compromised conversation quality.

Therefore, there is a need for efficient DST training with limited labels but large and multi-domain datasets of dialogue history data.

BRIEF DESCRIPTION OF THE DRAWINGS

FIGS. 8A, 8B, and 8C illustrates attention visualization for an example dialogue history.

FIGS. 9A, 9B, and 9C illustrates attention visualization for another example dialogue history.

FIGS. 10A, 10B, and 10C illustrates attention visualization for another example dialogue history.

FIG. 11 illustrates attention visualization for another example dialogue history.

FIG. 12 illustrates attention visualization for another example dialogue history.

FIGS. 14A and 14B illustrate a correlation on test sets between latent dialogue states and true dialogue states using 1% labeled data.

Figure 1:
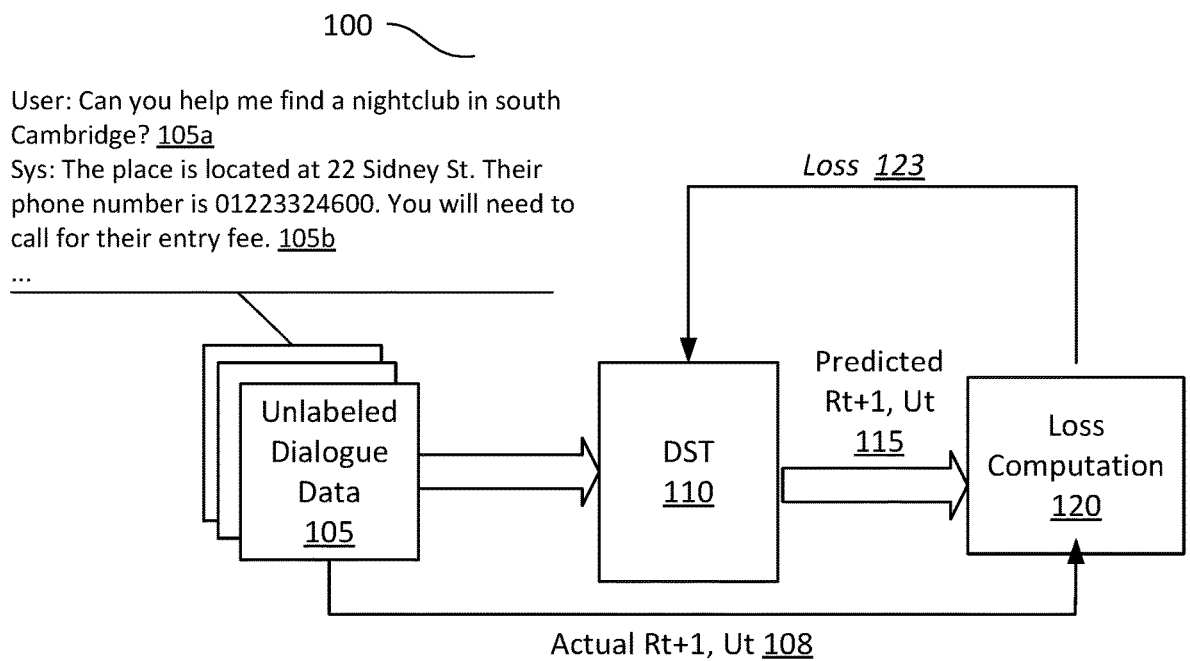
FIG. 1 provides an example block diagram illustrating an aspect of using unlabeled dialogue data to train a DST module, according to embodiments described herein.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented using one or more neural networks.

Overview

Artificial intelligence, implemented with neural networks and deep learning models, can be used to implement a task-oriented dialogue. In task-oriented dialogue, a human user engages in a "conversation" or dialogue with an automated system or agent to achieve specific user goals in one or more task-oriented domains, such as, for example, hotel, flight, taxi, and restaurant booking or reservations, finding places of interest, helping with navigation or driving directions.

In a dialogue, each user utterance typically contains important information identified as slots related to a dialogue domain such as attraction-area and flight-day. One component of a task-oriented dialogue system is Dialogue State Tracking (DST) to generate dialogue state information, which aims to identify user goals expressed at each turn of the conversation in the form of dialogue states. A dialogue state at a dialogue turn, e.g., a pair of a user utterance and a subsequent system response, may appear in the form of a (domain, slot, value) tuple. The domain indicates the universe that the content of the dialogue relates to, the slot indicates the category of information and a corresponding value specifies the content of information. For instance, the user utterance "can you help me find a night club in south Cambridge" can be decoded as inform (area, south) and request (address), meaning that the user has specified the value "south" for slot "area" and requested the value for another slot "address." A dialogue state may comprise different slot-value pairs, and may correspond to a single domain or multiple different domains.

Existing artificial intelligence (AI) systems often use a large amount of supervised dialogue data, e.g., historical dialogue with annotated state labels, to train the DST model. However, collecting dialogue state labels can be rather expensive and time-consuming, often requiring dialogue experts or trained personnel to manually identify the domain, slot and value for each turn in the dialogues. In particular, when the size of annotated data reduces, e.g., from 100% of annotated data for DST training to 1% of annotated data for DST training, existing "label-hungry" training systems mostly experience a sharp performance drop. Thus, when dialogues expand from a single domain to multiple domains (e.g., a dialogue system for handling multiple tasks, such as flight reservations, hotel reservations, driving directions, etc.) or even a massive-multi-domain setting, the excessive annotation required to enlarge the training dataset renders the DST model largely unscalable to new domains.

In view of limited efficiency of existing supervised DST training with labeled dialogue, embodiments described herein provide a self-supervised training mechanism for DST modules without engaging large amounts of pre-annotated dialogue data. FIG. 1 provides an example block diagram 100 illustrating an aspect of using unlabeled dialogue data to train a DST module 110, according to embodiments described herein. The DST module 110 can be any of existing DST models which may be ontology-based, partial-ontology-based, or ontology-free. Ontology-based DST models train metric learning functions for context encoder and ontology encoder, and score candidates over predefined slot value candidates. Partial-ontology-based models only use part of an ontology to perform ranking and use generation techniques for the remaining slots. Ontology-free models rely on generation with copy mechanism without predefined ontology, which has better generalization ability to unseen slot values. While all these existing DST models are traditionally trained with labeled data, the training mechanism shown at diagram 100 and throughout the application can be particularly beneficial to the ontology-free DST models because an ontology cannot be accessed under limited labeled data scenarios. However, embodiments described herein are not limited to the ontology-free DST models but can be generally applied to any ontology-based or partial-ontology based DST models.

As shown in FIG. 1, unlabeled dialogue data 101, e.g., in the form of a time sequence of dialogue pairs of user utterance $U_t$ and a system response $R_t$ at t-th dialogue turn, denoted by $X_{1:T}=\{(U_1, R_1), \ldots, (U_T, R_T)\}$ in T turns of a dialogue, is provided for DST module 110 for self-supervised training. For example, an example user utterance 105$a$ may take a form as "can you help me find a night club in south Cambridge?" and the corresponding system response 105$h$ may take a form as "The place is located at 22 Sidney St. Their phone number is 01223324600. You will need to call for their entry fee." The dialogue state information, e.g., domain, slot or value of each dialogue pair $(U_t, R_t)$ is not pre-annotated in the input of dialogue data 105.

Specifically, instead of relying on pre-annotated dialogue state information for every dialogue turn for training, the correlation between dialogue states and system behavior is learnt to train the DST module 110. Namely, if users and systems are discussing a similar context in different conversations, those conversations may have similar dialogue state information. For example, if a system replies "Do you need the address of the restaurant?" in two different dialogues, the system should have known some booking information such as on which date and at which city. To learn such similarities between dialogues and between system behaviors, the DST module 110 includes the next system response and turn user utterance generation tasks to model a potential correlation between conversational behavior and dialogue states. Specifically, the DST module 110 generates a predicted next system response $\hat{R}_{t+1}$ for the next dialogue turn t and a predicted user utterance $\hat{U}_t$ for the current dialogue turn t based on current dialogue data and currently predicted dialogue state at the particular dialogue turn t. The loss computation module 120 then uses the generated system response and user utterance 115 and the actual system response $R_{t+1}$ at dialogue turn t and the actual user utterance $U_t$ at dialogue turn t 108 obtained from the input data 105 for generating a loss function 123 to update the DST module 110. Thus, the training mechanism is "self-supervised" without supervised dialogue state information from labeled data. Further details of self-supervised DST training are discussed in relation to FIGS. 3-4.

In addition, one goal of DST module 110 is the robustness to a small perturbation of input dialogue history, e.g., a slight change in wording of the input would not significantly alter the dialogue and any system action resulted from the dialogue. Embodiments described herein further provide a mechanism to boost prediction consistency of a few perturbed inputs in self-supervised DST training, making a DST model more robust to unseen scenarios. Specifically, a small number of input words from the original input of unlabeled dialogue data 105 are randomly masked into unknown words for multiple times to generate multiple masked training dialogues. Model prediction distributions generated from the multiple masked training dialogues and the original training dialogue are then used to generate an error metric indicating a degree of difference between prediction distributions from masked and unmasked dialogues. The error metrics are then incorporated into the loss metric 123 for updating the DST module to boost the prediction consistency. Further details relating to prediction consistency are discussed in relation to FIGS. 6-7.

Computing Environment

Figure 2:
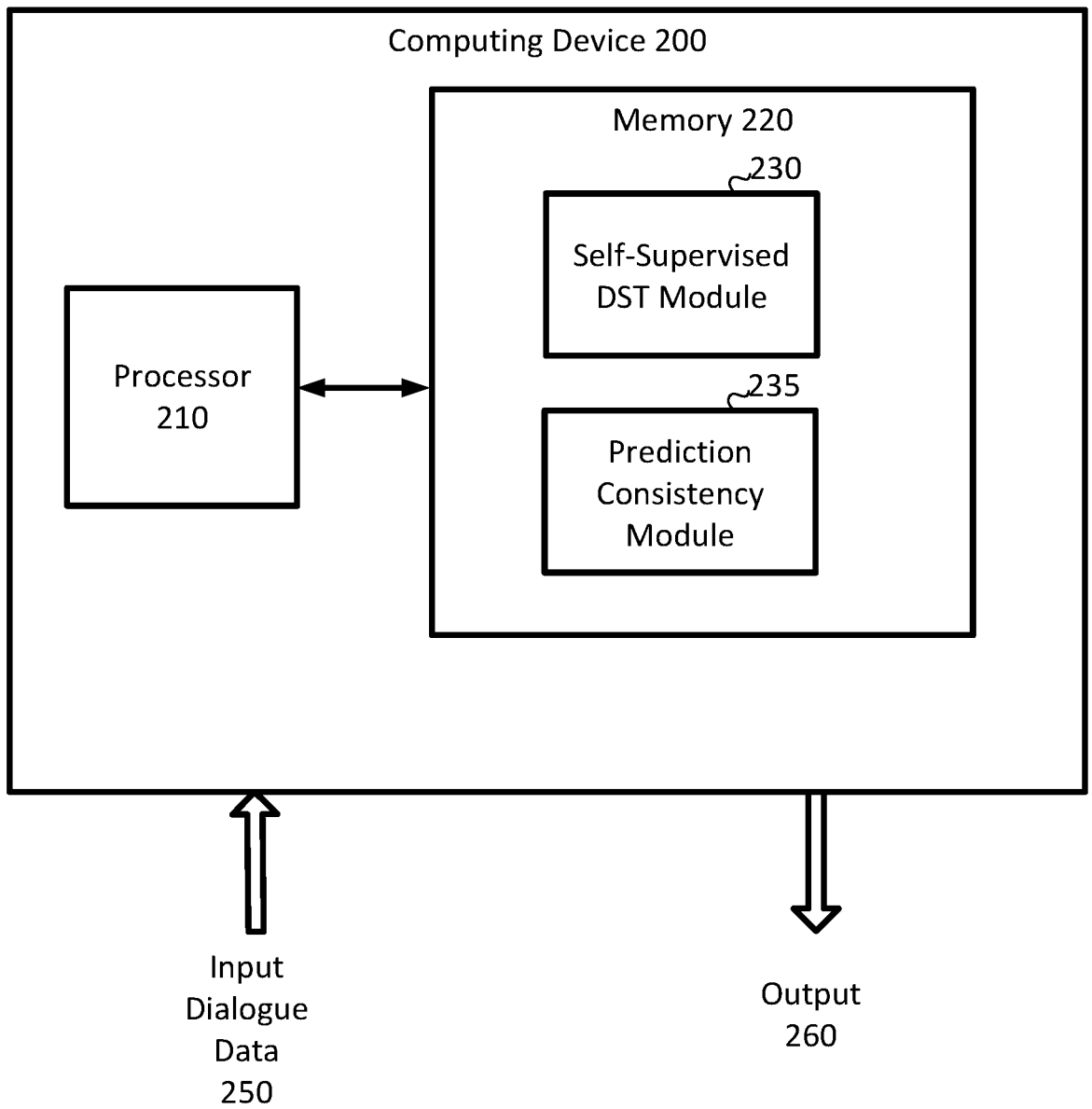
FIG. 2 is a simplified diagram of a computing device implementing the self-supervised DST training mechanism shown in FIG. 1, according to some embodiments.

FIG. 2 is a simplified diagram of a computing device 200 implementing the self-supervised DST training mechanism shown in FIG. 1, according to some embodiments. As shown in FIG. 2, computing device 200 includes a processor 210 coupled to memory 220. Operation of computing device 200 is controlled by processor 210. Although computing device 200 is shown with only one processor 210, it is understood that processor 210 may be representative of one or more central processing units (CPUs), multi-core processors, microprocessors, microcontrollers and/or the like computing device. Although processor 210 may include one or more general purpose central processing units (CPUs), processor 210 may additionally or alternatively include at least one processor that provides accelerated performance when evaluating neural network models. For example, processor 210 may include field programmable gate arrays (FPGAs), application specific integrated circuits (ASICs), graphics processing units (GPUs), tensor processing units (TPUs), digital signal processor (DSPs), single-instruction multiple-data (SIMD) processors, and/or the like in computing device 200. Generally, such processors may accelerate various computing tasks associated with evaluating neural network models (e.g., training, prediction, preprocessing, and/or the like) by an order of magnitude or more in comparison to a general-purpose CPU. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. In some examples, memory 220 may include non-transitory, tangible, machine-readable media that includes executable code that when run by one or more processors (e.g., processor 210) may cause the one or more processors to perform the methods described in further detail herein. Memory 220 may include various types of short-term and/or long-term storage modules including cache memory, random access memory (RAM), static random access memory (SRAM), dynamic random access memory (DRAM), non-volatile memory (NVM), flash memory, solid state drives (SSD), hard disk drive (HDD), optical storage media, magnetic tape, any other memory chip or cartridge, and/or any other medium from which a processor or computer is adapted to read. Some common forms of machine-readable media may include flexible disk, hard disk, magnetic tape, any other magnetic medium, compact disk read-only memory (CD-ROM), any other optical medium, punch cards, paper tape, any other physical medium with patterns of holes, programmable read-only memory (PROM), erasable programmable read-only memory (EPROM), electrically erasable programmable read-only memory (EEPROM), any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for a self-supervised DST module 230 and a prediction consistency module 235 that may be used to implement and/or emulate the neural network systems and models described further herein and/or to implement any of the methods described further herein. In some examples, the self-supervised DST module 230 and the prediction consistency module 235 may be implemented using hardware, software, and/or a combination of hardware and software. In some embodiments, the self-supervised DST module 230 may be similar to the DST module 110 shown in FIG. 1. As shown, computing device 200 receives an input 250, e.g., dialogue data, which is provided to the self-supervised DST module 230 and the prediction consistency module 235, which then generates an output 260, e.g., in the form of updated parameters for the DST module 230.

According to some embodiments, computing device 200 with DST module 230 and prediction consistency module 235 implements a self-supervised or semi-supervised encoder-decoder framework for DST training. In some embodiments, the input 250 can include unlabeled dialogue data, which may take a similar form to 105 in FIG. 1. In some embodiments, the input 250 may include both labeled and unlabeled data for semi-supervised training.

In one embodiment, the self-supervised DST module 230 and prediction consistency module 235 may be operated concurrently, sequentially or independently. For example, the self-supervised DST module 230 may be operated for DST training based on a loss metric generated from training data in the input 250. The prediction consistency module 235 may be optionally operated in parallel to further add a consistency loss metric to the loss metric for DST training by perturbing a small set of words from the training data in the input 250.

Self/Semi-Supervised DST Training

Figure 3:
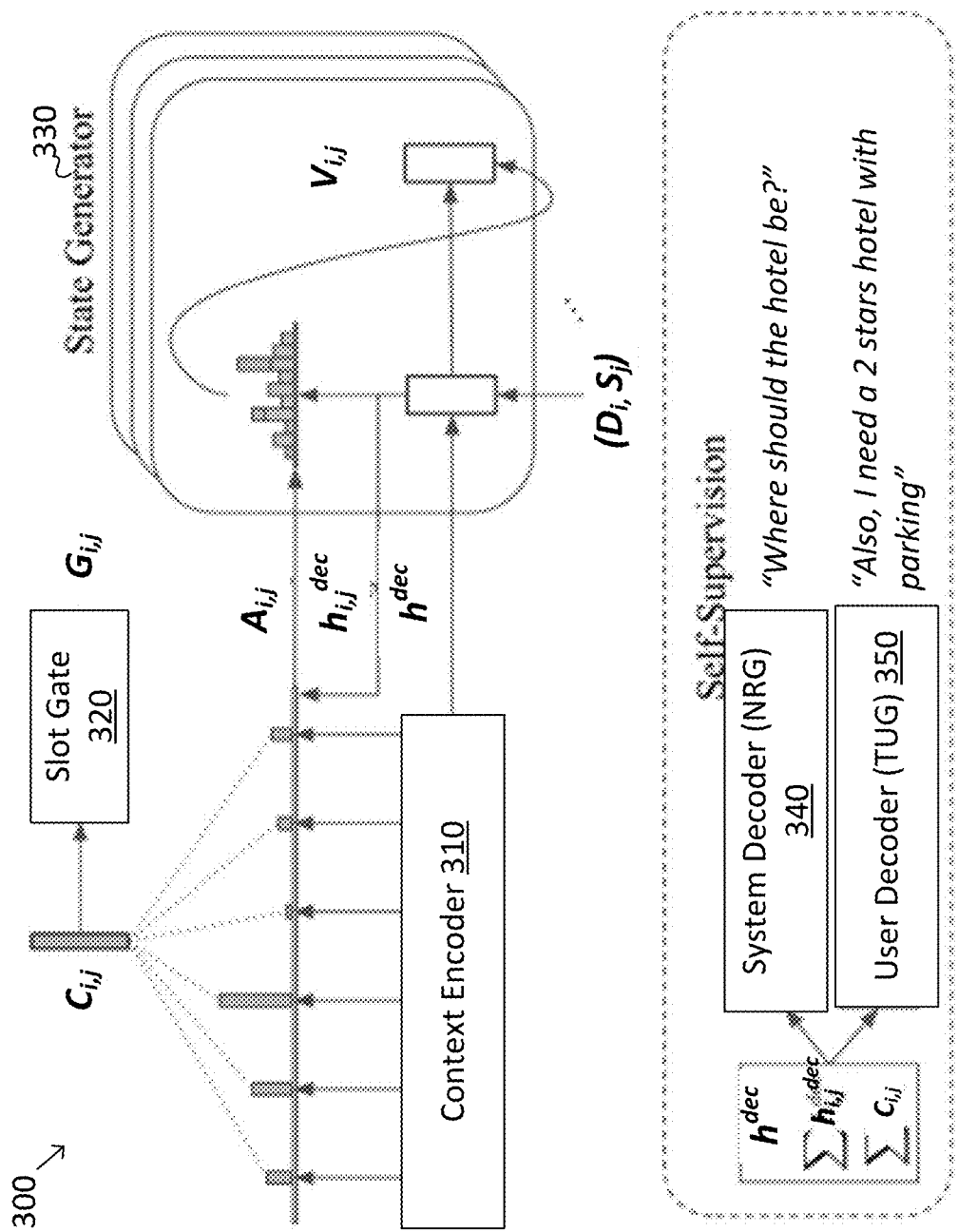
FIG. 3 is a simplified diagram of a self-supervised encoder-decoder framework for dialogue state tracking according to some embodiments.

FIG. 3 is a simplified diagram illustrating an example encoder-decoder framework 300 for the self-supervised DST module 230 in FIG. 2 or the DST module 110 in FIG. 1, according to some embodiments. The encoder-decoder framework 300 includes a context encoder 310, a slot gate classifier 320, a state generator 330, and one or more decoders 340 and 350. The context encoder 310 receives and encodes the input 250 of a dialogue history. The dialogue history can be expressed as $X_{1:T}=\{(U_1, R_2), (U_2, R_2) \ldots (U_T, R_T)\}$, which is the set of user utterance (U) and system response (R) pairs in T turns of a dialogue. The dialogue history $X_{1:t}$ is associated with dialogue states expressed as $B=\{B_1, B_2, \ldots, B_T\}$ where each $B_t$, $1 \leq t \leq T$, represents a set of (domain, slot, value) dialogue state tuples accumulated from turn 1 to turn t. The number of tuples usually grows with turn t. Note that for multi-domain dialogues, it is common to have multiple domains triggered in the same state $B_t$. Specifically, when the input 250 only contains unlabeled dialogue data, e.g., 105 in FIG. 1, context encoder 310 does not have state information $B=\{B_1, B_2, \ldots, B_T\}$ pre-annotated with $X_{1:T}=\{(U_1, R_2), (U_2, R_2) \ldots (U_T, R_T)\}$.

The context encoder 310 encodes the input of dialogue data $X_{1:T}=\{(U_1, R_2), (U_2, R_2) \ldots (U_T, R_T)\}$ into context vectors $C_{ij}$ for each (domain, slot) pair $\{(D_i, S_j)\}$, where i, j indicates the indices for the domain and slot, respectively. For example, the context vector $C_{ij}$ is the weighted-sum of encoder hidden states of the context encoder 310 using the attention distribution $A_{ij}$ for each (domain, slot) pair $\{(D_i, S_j)\}$.

The context encoder 310 then sends the context vectors $C_{ij}$ to the slot gate classifier 320, which predicts whether a (domain, slot) pair is mentioned in the input dialogue data, not mentioned, a user does not care, or other special situations. More specifically, each (domain, slot) pair obtains its context vector $C_u$ for the slot gate classifier 320 to generate predict a slot gate $G_{ij}$ distribution. If the predicted result generated by the slot gate classifier 320 is mentioned in the input dialogue data, the state generator output is treated as its slot value; otherwise, the slot value is either "none", "don't care", etc. Further details of the slot gate classifier 320 can be found in at least Xu et al., "An end-to-end approach for handling unknown slot values in dialogue state tracking," In Proceedings of the 56th Annual Meeting of the Association for Computational Linguistics (Volume 1: Long Papers), pages 1448-1457; Rastogi et al., "Scalable multi-domain dialogue state tracking," In 2017 IEEE Automatic Speech Recognition and Understanding Workshop (ASRU), pages 561-568; and Zhang et al., "Find or classify? dual strategy for slot-value predictions on multi-domain dialog state tracking," arXiv preprint arXiv:1910.03544, all of which are hereby expressly incorporated by reference herein in their entirety.

The state generator 330 is configured to generate an output 333 of state information $B=\{B_1, B_2, \ldots, B_T\}$ corresponding to the dialogue data $X_{1:T}=\{(U_1, R_2), (U_2, R_2) \ldots (U_T, R_T)\}$ for T dialogue turns. Specifically, the state generator 330 obtains information of each (domain, slot) pair $\{(D_i, S_j)\}$ and decodes the corresponding slot values $V_{ij}$ to produce the output tuples 333 of (domain, slot, value). In some embodiments, the state generator 330 receives encoder states, e.g., the last hidden state $h^{enc}$ of the context encoder 310, and attention distribution $A_{ij}$ from the context encoder 310 to compute the context vector $C_{ij}$ as the weighted-sum of encoder hidden states $h^{enc}$ of the context encoder 310 using the attention distribution $A_{ij}$ for each (domain, slot) pair $\{(D_i, S_j)\}$. In this way, the state generator 330 decodes slot values $V_{ij}$ that are conditioned on each (domain, slot) pair $\{(Di, Sj)\}$. One way to condition the state generator 330 is to use each (domain, slot) pair as the start-of-sentence token and parallelly decode slot values. In some embodiments, a copy mechanism such as pointer generator model can be added to the state generator 330 to strengthen value generation. Further details of a copy mechanism can be found in See et al., "Get to the point: Summarization with pointer-generator networks," In Proceedings of the 55th Annual Meeting of the Association for Computational Linguistics (Volume 1: Long Papers), volume 1, pages 1073-1083, which is hereby expressly incorporated by reference herein in its entirety.

Thus, the encoder-decoder framework 300 may be trained end-to-end with two cross-entropy loss functions, one is for slot values $V_{ij}$ generation and the other is for slot gate $G_{ij}$ prediction. When the input 250 of training data contains annotated dialogue state labels, the overall supervised learning objective is given by $$L_{sl} = \sum^{|ij|} H(V_{ij}, \hat{V}_{ij}) + H(G_{ij}, \hat{G}_{ij}),$$

where H is the entropy function, |ij| is the total number of (domain, slot) pairs, V and G represent the actual slot values and slot gates obtained from state labels pre-annotated in the input training data 250, and $\hat{V}$ and $\hat{G}$ represent predicted slot values and slot gates.

When the input 250 only contains unlabeled dialogue data, the actual slot values and slot gates $V_{ij}$ and $G_{ij}$ are not available for training. In that case, the encoder-decoder framework 300 adopts a self-supervision module 332 to model the correlation between conversation and system behavior, based on which DST module can be trained without pre-annotated dialogue stage labels. Specifically, it is hypothesized that with similar dialogue states, the task-oriented dialogue system or agent will reply with similar responses. For example, when a system or agent asks "Where should the hotel be", it can be inferred that the system's state may include (hotel, reservation). Similarly, when a system asks "What is your taxi destination from Palo Alto?", then it can be inferred that a system's state may include (taxi, departure, Palo Alto). In this way, the framework 300 can potentially model the correlation between dialogue states and system behavior.

Specifically, the self-supervision module 332 implements two self-supervised objects, a system decoder next response generation (NRG) module 340 to generate a predicted next system response 341, and a user decoder turn utterance generation (TUG) module 350 to generate a predicted current user utterance 351. The NRG module is configured to generate the next system response based on the current conversation and current predicted dialogue states, while the TUG module 350 is configured to guess what conversation has been done at the current turn from a user perspective, i.e., if users tend to request similar information, then two dialogue states may be similar as well. For instance, TUG module 350 is configured to recover the missing conversational turn that can fulfill the state transition, e.g., when a user utters "Also, I need a 2 stars hotel with parking" the states (hotel, parking, yes) and (hotel, stars, 2) should be included.

An input to the self-supervision module 332 may include the context vectors 315 $C_{ij}$ and the hidden states 313 $h^{enc}$ of the context encoder 310 and the hidden states 323 $h^{dec}_{ij}$ of the state generator 330 corresponding to the domain slot pair $\{(Di, Sj)\}$ from the state generator 330.

The generated next system response 341 and current user utterance 351 are then compared with the actual next system response and the actual current user utterance in the original unlabeled dialogue data to compute entropy loss, instead of using slot values and slot gates as used with supervised training. Details of the operations of NRG 340 and TUG 350 are discussed in relation to FIG. 4. In some embodiments, the self-supervised modules 340 and 350 may be discarded during inference time.

In the framework 300, the context vector $C_{ij}$ is the weighted-sum of encoder hidden states using the attention distribution $A_{ij}$, meaning the context vectors have a high correlation with learned attention distributions. Also, context vectors are used to predict slot gates $G_{ij}$. Therefore, using self-supervision to align slot contextual vectors may help to obtain or achieve better attention distributions and slot gate prediction.

In some embodiments, the framework 300 is implemented with or includes one or more neural network models. In some embodiments, a Transferable Dialogue State Generator (TRADE) neural network model is used as a base for the DST model of framework 300. Details for the TRADE model are provided in Wu et al., "Transferable multi-domain state generator for task-oriented dialogue systems," In Proceedings of the 57th Annual Meeting of the Association for Computational Linguistics, pages 808-819, the entirety of which is incorporated by reference. The TRADE model is selected because, among other things, (1) it is a generative model equipped with a copy mechanism that can generate unseen slot values, (2) it shows good domain generalization ability in its zero-shot and few-shot experiments, and (3) it is can achieve promising joint goal accuracy for an ontology-free model.

In some embodiments, framework 300 can also be applied or used with other DST models. For example, the BERTQA-based span extraction methods and models, as described in more detail in Chao et al., "Bert-dst: Scalable end-to-end dialogue state tracking with bidirectional encoder representations from transformer," arXiv preprint arXiv:1907.03040, 2019, which is incorporated by reference herein, can be applied with slight modification, e.g. viewing [CLS] token as the encoded vector and the span distributions as the slot contextual representations.

Figure 4:
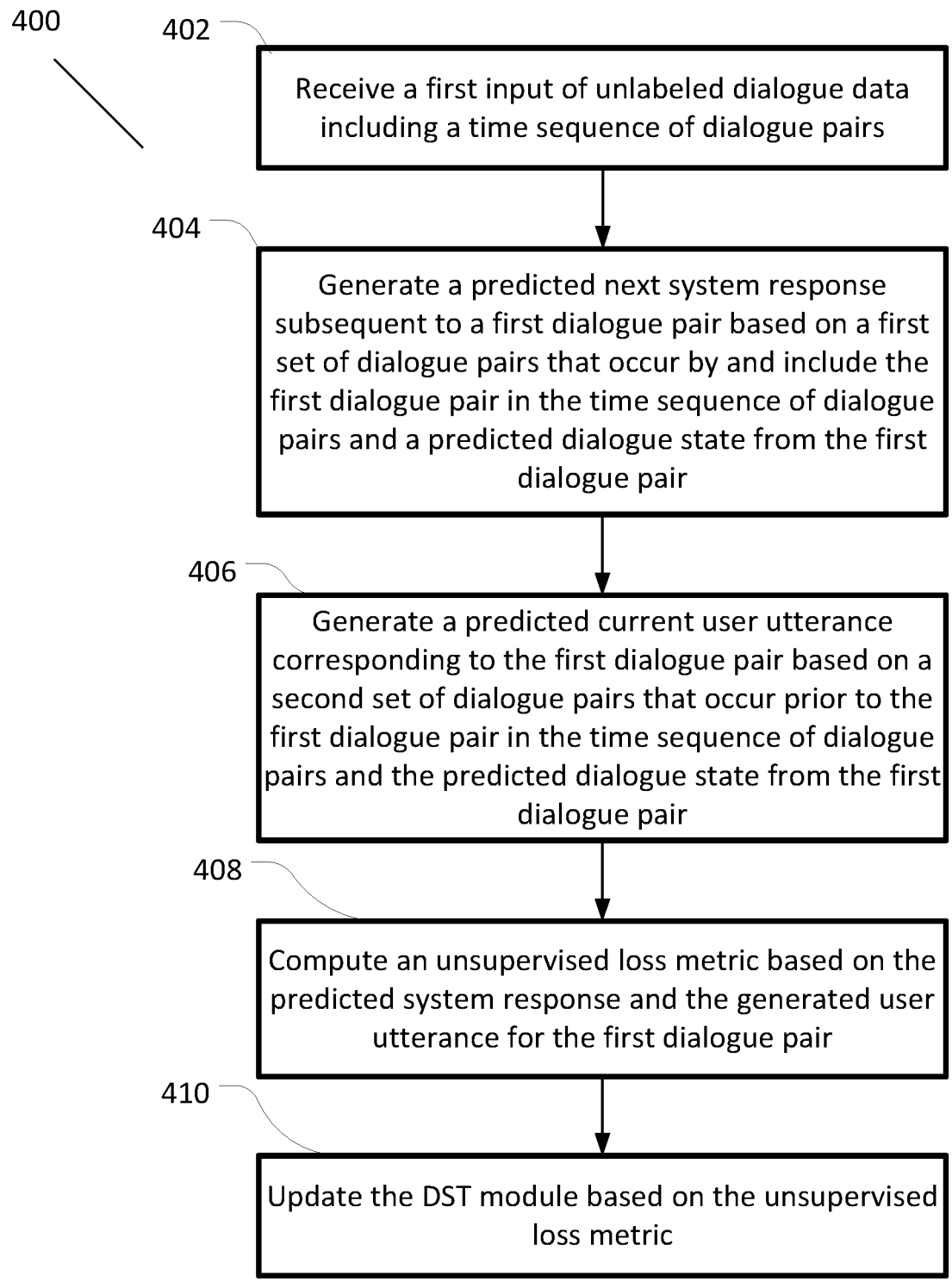
FIG. 4 is a simplified diagram of a method for self-supervised training of a DST module using unlabeled dialogue data, according to one embodiment.

FIG. 4 is a simplified diagram of a method 400 for self-supervised training of a DST module using unlabeled dialogue data, according to one embodiment. Such DST model can be similar to the DST module 110 in FIG. 1 or the self-supervised DST module 230 in FIG. 2. In some embodiments, method 400 may be implemented by the encoder-decoder framework 300 of FIG. 3. One or more of the processes 402-410 of method 400 may be implemented, at least in part, in the form of executable code stored on non-transitory, tangible, machine-readable media that when run by one or more processors may cause the one or more processors to perform one or more of the processes 402-410.

Method 400 starts with process 402, where an input of unlabeled dialogue data is received, e.g., from a training database. For example, the input of unlabeled dialogue data, which may be similar to 105 in FIG. 1 or input 250 in FIGS. 203, includes a time sequence of dialogue pairs, each including a respective unlabeled user utterance and a respective unlabeled system response, e.g., $X_{1:T} = \{(U_1, R_2), (U_2, R_2) \ldots (U_T, R_T)\}$ for T dialogue turns. For instance, the MultiWOZ dataset, which is a large-scale Multi-domain Wizard-of-Oz Dataset, is an example input of dialogue data to benchmark DST models. The MultiWOZ dataset can be used found in Budzianowski et al., "Multiwoz-a largescale multi-domain wizard-of-oz dataset for task-oriented dialogue modelling," Proceedings of the 2018 Conference on Empirical Methods in Natural Language Processing, pages 5016-5026 (2018), which is hereby expressly incorporated by reference herein its entirety.

At process 404, a predicted next system response $\hat{R}_{t+1}$ subsequent to a first dialogue pair $(U_t, R_t)$ is generated based on a first set of dialogue pairs that occur by and include the first dialogue pair, e.g., $X_{1:t}$ in the time sequence of dialogue pairs and a predicted dialogue state $B_t$ from the first dialogue pair $(U_t, R_t)$ are generated. In some implementations, the predicted next system response $\hat{R}_{t+1}$ is generated, at a first dialogue turn t associated with the first dialogue pair, as a conditional probability distribution of the predicted system response for a subsequent dialogue turn conditioned on the first set of dialogue pairs and the predicted dialogue state inferred from the first dialogue pair at the first dialogue turn. For example, the system decoder NRG module 340 may be configured to generate the next system or agent response based on the current conversation and current predicted dialogue states according to the probability function of the model: $P(R_{t+1}|X_{1:t}, B_t)$. The system decoder 340 tends to align the dialogue state $B_t$ between different dialogue history from a system perspective, i.e., if the system tends to generate similar system responses in two different dialogues, then two dialogue states are supposed to be similar to each other.

At process 406, a predicted current user utterance $\hat{U}_t$ corresponding to the first dialogue pair $(U_t, R_t)$ is generated based on a second set of dialogue pairs that occur prior to the first dialogue pair, e.g., $X_{1:t-1}$ in the time sequence of dialogue pairs and the predicted dialogue state from the first dialogue pair. In some embodiments, the predicted current user utterance $\hat{U}_t$ is generated, at a first dialogue turn t associated with the first dialogue pair, as a conditional probability distribution of the predicted user utterance for the first dialogue turn conditioned on the second set of dialogue pairs and the predicted dialogue state inferred from the first dialogue pair at the first dialogue turn. For example, the user decoder TUG module 350 may be configured to generate the conditional probability $P(U_t|X_{1:t-1}, B_t)$. User decoder 350 attempts or tries to guess what conversation has been done at the current turn t from a user perspective, e.g., if the user tends to request similar information, then two dialogue states may be similar as well.

In some embodiments, at processes 404-406, the predicted system response or the predicted user utterance may be generated by one or more gated recurrent units (GRUs). The GRUs are used to generate a sequence of words and compute cross-entropy losses between generated sentences and target sentences at process 408. In some embodiments, attention mechanism can be optionally skipped for the system decoder NUG module 340 and the user decoder TUG module 350 to save resources. Because it is expected that the GRUs can generate the sentences by solely aligning initial states, and the performance of sentence generation does not significantly impact the training performance.

In some embodiments, the GRUs are initialized by information from the context encoder 310 that encodes the input of unlabeled dialogue data and generates each output word conditioned on the hidden states of the context encoder 310. For example, the GRUs receives the last hidden state of the context encoder 310 as the initial states $h_{init}$ of the GRUs, e.g., setting $$h_{init} = h^{enc},$$

where $h^{enc}$ is the last hidden state of the context encoder 310. This encoder-based approach can be viewed as three decoders, e.g., state generator 330, system decoder 340 and user decoder 350 in framework 300 sharing the same context encoder 310 to perform multi-task training.

In some embodiments, the GRUs are initialized by information from state generator 330, such as hidden states of the state generator 330 queried by each domain-slot pair and a respective context vector corresponding to the respective domain-slot pair, and an average slot contextual representation is computed based on the hidden states and context vectors as an initial state. Namely, the GRUs are initialized by the slot contextual representations without predicted slot values, e.g., $$h_{init} = \sum^{|ij|} [h_{ij}^{dec}; C_{ij}],$$

where $h_{ij}^{dec}$ is the hidden state of the state generator 330 queried by (domain, slot) pair $(D_i, S_j)$, and $C_{ij}$ is its context vector. The symbol [;] is used to represent vector concatenation.

At process 408, an unsupervised loss metric is computed based on the predicted system response, the generated user utterance and the first dialogue pair. In some embodiments, the unsupervised loss metric is computed as a sum of a first cross entropy between the predicted system response and an actual system response from a second dialogue pair subsequent to the first dialogue pair, and a second cross entropy between the generated user utterance and an actual user utterance from the first dialogue pair. For example, the overall self-supervised loss function $L_{uns}$ for modeling user and system behaviors is the given by $$L_{uns} = H(R_{t+1}, \hat{R}_{t+1}) + H(U_t, \hat{U}_t),$$

where $\hat{R}_{t+1}$ and $\hat{U}_t$ are predicted response and user utterance initialized by the $h_{init}$ vector, and $R_{t+1}$ and $U_t$ are the actual response and user utterance obtained from dialogue data $X_{1:t}$.

At process 410, parameters of the DST module are updated based on the unsupervised loss metric computed at process 408, e.g., via backpropagation.

Figure 5:
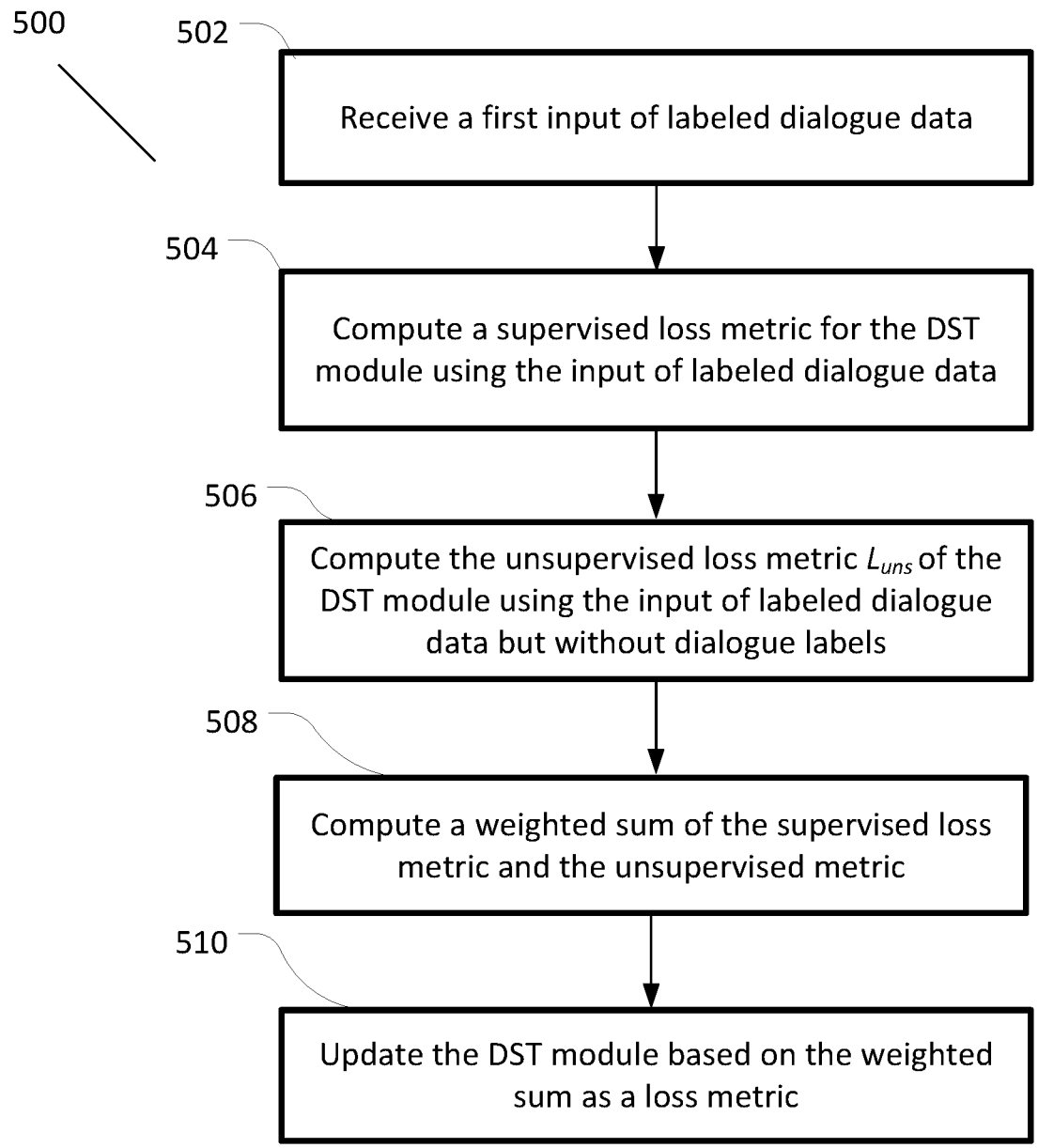
FIG. 5 is a simplified diagram of a method for semi-supervised training of a DST module using labeled dialogue data and unlabeled dialogue data, according to one embodiment.

FIG. 5 is a simplified diagram of a method 500 for semi-supervised training of a DST module using labeled dialogue data and unlabeled dialogue data, according to one embodiment. Such DST model can be similar to the DST module 110 in FIG. 1 or the self-supervised DST module 230 in FIG. 2. In some embodiments, method 500 may be implemented by the encoder-decoder framework 300 of FIG. 3. One or more of the processes 502-510 of method 500 may be implemented, at least in part, in the form of executable code stored on non-transitory, tangible, machine-readable media that when run by one or more processors may cause the one or more processors to perform one or more of the processes 502-510.

In some embodiments, the systems and methods of the present disclosure use both unlabeled and labeled data. That is, in addition to labeled data, the systems and methods of the present disclosure can also sample unlabeled data to perform self-supervision as a regularization term. This strategy can be considered as a semi-supervised approach, leveraging unlabeled data to learn a smooth prediction. In some embodiments, a hatch of training samples are initially drawn from labeled data to update the model's parameters; then, another batch of samples are drawn from unlabeled data to perform the same computation.

Method 500 starts with process 502, where an input of labeled dialogue data is received, e.g., as part of the input 250 in FIG. 2 in addition to unlabeled dialogue data 105 in FIG. 1.

At process 504, a supervised loss metric for the DST module is computed using the input of labeled dialogue data. For example, the supervised loss metric $L_{sl}$ can be obtained based on cross entropy of slot value predictions from the state generator 330 and annotated state information from the as discussed in relation to FIG. 3.

At process 506, the unsupervised loss metric $L_{uns}$ of the DST module is computed using the input of labeled dialogue data but without dialogue labels. For example, method 400 in FIG. 4 can be used to compute the unsupervised loss metric $L_{uns}$.

Figure 6:
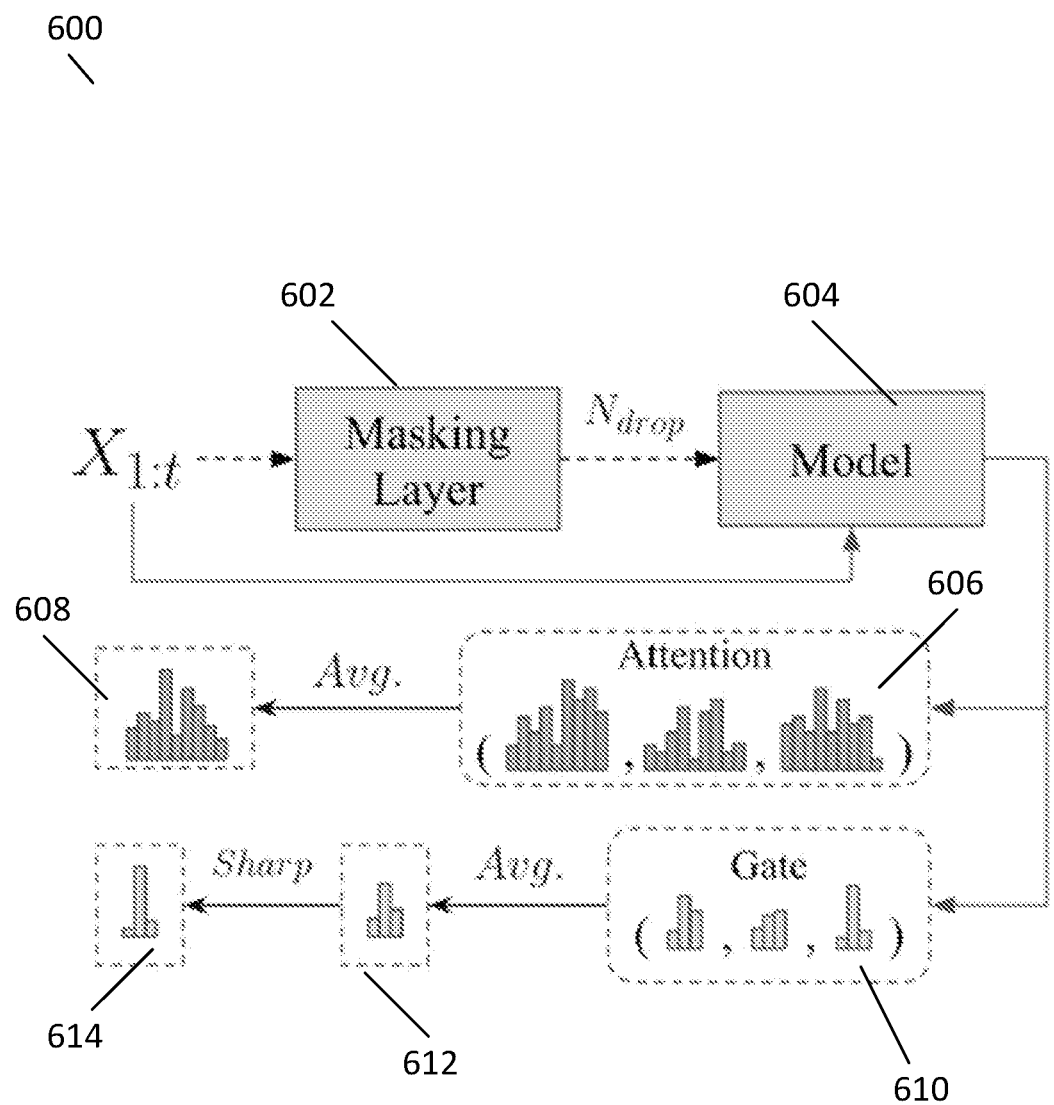
FIG. 6 illustrates a block diagram illustrating a prediction consistency mechanism for DST training, according to one embodiment described herein.
Figure 7:
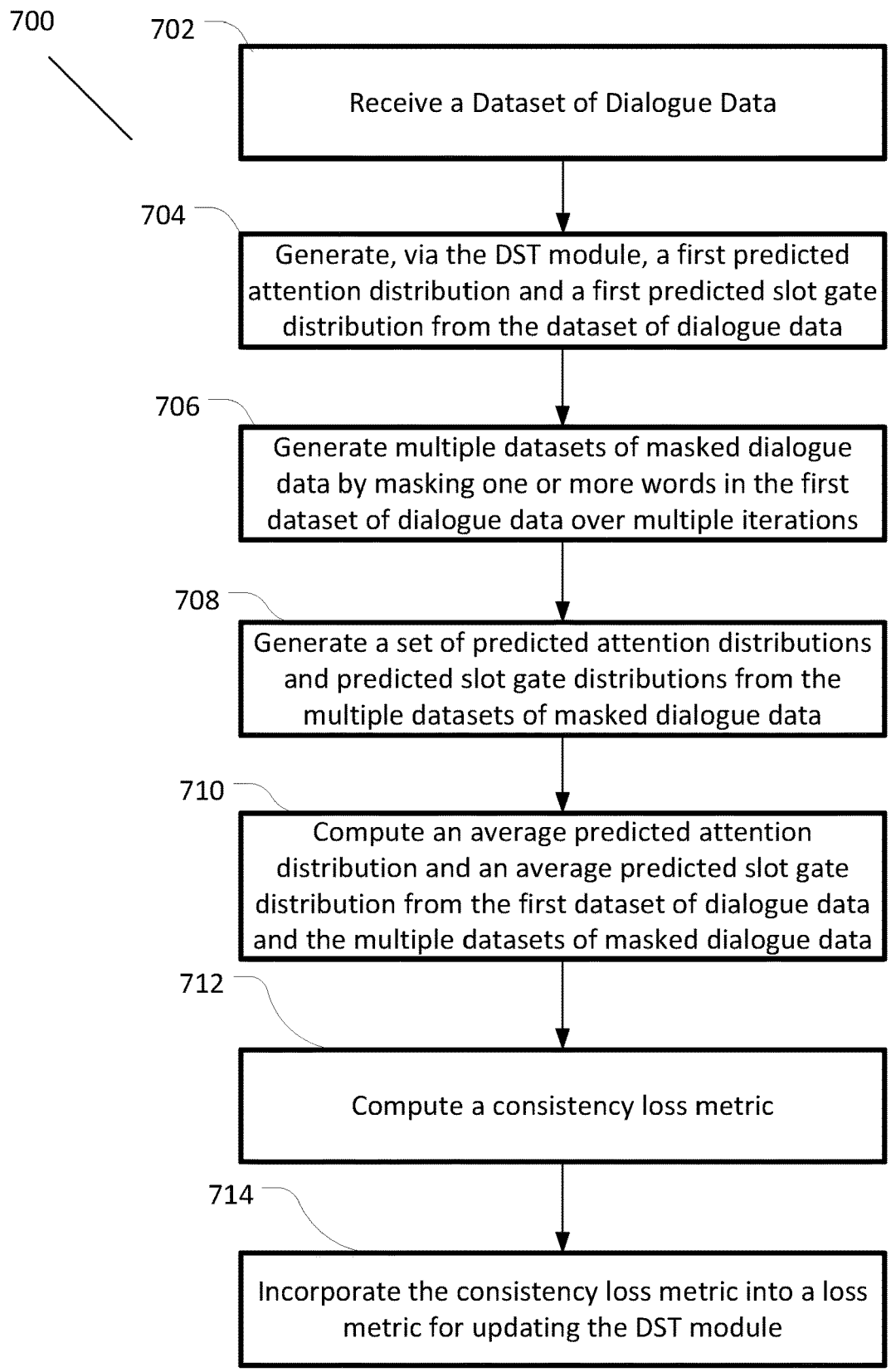
FIG. 7 is a simplified diagram of a method for prediction consistency training of a DST module, according to one embodiment.

At process 508, a weighted sum of the supervised loss metric and the unsupervised metric is computed. At 510, the DST module is updated based on the weighted sum of the supervised loss metric and the unsupervised loss metric. For example, the overall loss function for labeled data is given by:

$$L_{label} = L_{sl} + \alpha L_{uns} + \alpha \beta L_{cons},$$

where $L_{cons}$ is a consistency metric as further discussed in relation to FIGS. 6-7, $\alpha$ and $\beta$ are hyper-parameters. In this way, both supervised signal and self-supervised signal can be optimized on labeled data.

If other unlabeled data is accessible or available, then after the above objective function is used to update parameters $\theta$, the systems and methods of the present disclosure can further use self-supervised signal on unlabeled data to update the model, $$L_{unlabel} = L_{uns} + \beta L_{cons}.$$

At process 510, the weighted sum of the supervised loss metric and the unsupervised metric is used as the loss metric to update the DST module.

In some embodiments, the DST module may be intermittently, concurrently or alternately trained by using the weighted sum of the supervised loss metric and the unsupervised loss metric derived from labeled dialogue data, and using the unsupervised loss metric derived from unlabeled dialogue data. For example, the framework 300 may take turns to train the DST model using unlabeled data and labeled data, e.g., one batch of labeled data and then another batch of unlabeled data, which may be repeated for multiple rounds. For another example, the framework 300 may pre-train the DST model using unlabeled data, and then fine-tune the DST model parameters using labeled data.

Therefore, using the self-supervised method 400 and/or the semi-supervised method 500, framework 300 can leverage dialogue history X (which can be readily collected or obtained) to implicitly boost DST performance without annotated dialogue state labels. In this way, a scalable solution of DST can be achieved to improve DST performance in a multi-domain setting.

Prediction Consistency

FIG. 6 illustrates a block diagram 600 illustrating a prediction consistency mechanism for DST training, according to one embodiment described herein. The prediction consistency mechanism described at block diagram 600 may be implemented by the prediction consistency module 235 in FIG. 2. The prediction consistency mechanism may be executed in framework 300 as illustrated in FIG. 3 in conjunction with the self-supervised DST training method 400 in FIG. 4 or the semi-supervised DST training method 500 in FIG. 5. In one embodiment, the prediction consistency mechanism described by block diagram 600 may be implemented with other DST training methods.

As illustrated in FIG. 6, the dialogue history $X_{1:t}$, which is the section of user utterance and system response to turn t of the set $X_{1:T}$, where t≤T, is input to a masking layer 602, which masks out a small number of input words into unknown words for $N_{drop}$ times. Masking words into unknown words can strengthen the representation learning because when important words are masked (e.g. "I want a cheap restaurant." becomes "I want a [UNK] restaurant"), the DST module needs to reply on its contextual information to obtain a meaningful representation for the masked word. Details of masked language model learning, can be found in Devlin et al., "BERT: Pre-training of deep bidirectional transformers for language understanding," In Proceedings of the 2019 Conference of the North American Chapter of the Association for Computational Linguistics: Human Language Technologies, Volume 1 (Long and Short Papers), pages 4171-4186, 2019, which is incorporated by reference herein. In some embodiments, a small set of words are randomly masked from the input dialogue data, instead of only masking slot values.

In some embodiments, the system uses the $N_{drop}$ dialogue history, together with dialogue history $X_{1:t}$ (the one that does not drop any words), as input to the base model 604, and generates or obtains $N_{drop}+1$ model predictions. For example, the base model 604 may be the DST module 110 in FIG. 1, the self-supervised DST module 230 or framework 300 in FIG. 3. For another example, the base model 604 may be any other neural networks or models.

In some embodiments, for each of the $N_{drop}+1$ dialogue histories, the system generates or produces a guess for its attention distribution and slot gate distribution using the $N_{drop}+1$ models predictions, for example, similar to the label guessing process in MixMatch, as described in more detail in Berthelot et al., "Mixmatch: A holistic approach to semi-supervised learning," arXiv preprint arXiv: 1905.02249, 2019, which is incorporated by reference herein. In some embodiments, this guess can be later applied in a self-supervised loss term.

Specifically, the model predictions from base model 604 are input to an attention distribution module 606 to generate an average predicted attention distribution 608. Further, the model predictions from base model 604 are input to a slot gate distribution module 610 to generate an average predicted slot gate distribution 612. For example, the average attention distribution 608 and the average slot gate distribution 612 are computed by:

$$\hat{A}_{ij}^*, \hat{G}_{ij}^* = \frac{1}{N_{drop}+1} \sum_{d=1}^{N_{drop}+1} P(A_{ij}, G_{ij} \mid X_{1:t}^d, \theta),$$

where θ is the model parameters, $A_{ij}$ and $G_{ij}$ are the attention distribution and slot gate distribution for the (domain, slot) pair $(D_i, S_j)$, and $\hat{A}_{ij}^*$, $\hat{G}_{ij}^*$ denotes the average predicted attention distribution 608 and the average predicted slot gate distribution 612, respectively.

In some embodiments, a sharpening function is applied to the average slot gate distribution 612 to produce a sharpened distribution 614 as shown in FIG. 6. Such a sharpening process is consistent with entropy minimization. In some embodiments, sharpening is accomplished by adjusting the temperature T of the categorical distribution, to reduce the entropy of the average slot gate prediction by:

$$\hat{G}_{ij}^{**} = \text{Sharp}(\hat{G}_{ij}^*, T),$$

$$\text{Sharp}(p, T)_i = p_i^{\frac{1}{T}} \Big/ \sum p_i^{\frac{1}{T}}.$$

As T→0, the sharpened $\hat{G}_{ij}^{**}$ will approach a one-hot distribution. In some embodiments, a similar sharpening function may be applied to the average predicted attention distribution $\hat{A}_{ij}^*$ but it is not expected that the force attention distribution to be a sharp categorical distribution.

The guessed distributions $\hat{A}_{ij}^*$, $\hat{G}_{ij}^*$ can then be used, in some embodiments, to train the base model 604 to boost consistency for the attention and slot gate. The following consistency loss $L_{cons}$ is computed and added to the self-supervised loss metric or semi-supervised loss metric:

$$L_{cons} = \sum^{|ij|} MSE(\hat{G}_{ij}^{**}, \hat{G}_{ij}) + MSE(\hat{A}_{ij}^*, \hat{A}_{ij}),$$

where $\hat{A}_{ij}$, $\hat{G}_{ij}$ denotes the predicted attention distribution and predicted slot gate distribution using the unperturbed dialogue history, $\hat{A}_{ij}^*$ is the average predicted attention distribution over the $N_{drop}+1$ dialogue histories, $\hat{G}_{ij}^{**}$ is the sharpened average predicted slot gate distribution over the $N_{drop}+1$ dialogue histories, and MSE is the mean-squared error function over two distributions. By minimizing the mean-squared error between the average predicted distributions and the predicted distribution obtained using the original unperturbed dialogue history, the DST module is trained to reinforce the predicted attention and slot gate distributions to be more robust in the inference time.

In some embodiments, framework 300 trained in method 400 or method 500 can be consistent in terms of attention distributions and slot gate predictions because it can be difficult to maintain the quality of generated values in different perturbed input, especially when labeled data is not readily available. Also, each perturbed sample may generate slot values that have different number of words, which makes it hard to maintain distribution consistency. As a result, the systems and methods use slot gate distribution and attention distribution as intermediate targets since the former is the first stage for the whole prediction process, and the latter directly influences the copy mechanism.

FIG. 7 is a simplified diagram of a method 700 for prediction consistency training of a DST module, according to one embodiment. Such DST model can be similar to the DST module 110 in FIG. 1 or the self-supervised DST module 230 in FIG. 2. In some embodiments, method 700 may be implemented by the encoder-decoder framework 300 of FIG. 3. One or more of the processes 702-710 of method 700 may be implemented, at least in part, in the form of executable code stored on non-transitory, tangible, machine-readable media that when run by one or more processors may cause the one or more processors to perform one or more of the processes 702-710.

Method 700 starts with process 702, at which a first dataset of dialogue data is received. The dialogue data includes a first dialogue pair of a first unlabeled user utterance and a first unlabeled system response.

At process 704, a first predicted attention distribution and a first predicted slot gate distribution, e.g., $\hat{A}_{ij}$, $\hat{G}_{ij}$, is generated by the DST module from the first dataset of dialogue data.

At process 706, multiple datasets of masked dialogue data by masking one or more words in the first dataset of dialogue data over multiple iterations. In one embodiment, the one or more words are randomly selected from the first dataset of dialogue data and can be the same or different per the masking in different iterations.

At process 708, a set of predicted attention distributions and predicted slot gate distributions are generated from the masked dialogue data;

At process 710, an average predicted attention distribution and an average predicted slot gate distribution, e.g., $\hat{A}_{ij}^*$, $\hat{G}_{ij}^*$ are computed over the generated set of predicted attention distributions and predicted slot gate distributions. In one embodiment, the average predicted slot gate distribution, $\hat{G}_{ij}^*$, may be sharpened using a sharpening function to reduce the entropy of the average slot gate prediction, e.g., see, $\hat{G}_{ij}^{**}$ discussed in relation to FIG. 6.

At process 712, a consistency loss metric $L_{cons}$ is computed based on a first error metric between the average predicted attention distribution and the predicted attention distribution obtained from the original unperturbed dataset of dialogue data, and a second error metric between the (sharpened) average predicted slot gate distribution and the predicted slot gate distribution obtained from the original unperturbed dataset of dialogue. For example, the first error metric or the second error metric may be the mean-squared error function over two distributions.

At process 714, incorporating the consistency loss metric into a loss metric for updating the DST module. For example, the consistency loss $L_{cons}$ can be added to the self-supervised loss metric or semi-supervised loss metric for updating the DST module.

Example Implementation of Self/Semi-Supervised DST Training

A multi-domain DST test set example is illustrated in Table 1. Gold-standard states (e.g., pre-annotated by trained personnel) based on the dialogue are listed. Predicted states using DST modules are also provided, such as the TRADE model (Wu et al., "Transferable multi-domain state generator for task-oriented dialogue systems," Proceedings of the 57th Annual Meeting of the Association for Computational Linguistics, pages 808-819) trained with 100% labeled data, TRADE model trained with 1% labeled data, and TRADE model trained with 1% labeled data as well as self-supervision according to embodiments described herein.

TABLE 1

| | |
|---|---|
| USR | Can you help me find a night club in south Cambridge? |
| SYS | The place is located at 22 Sidney St. Their phone number is 01223324600. You will need to call for their entry fee. |
| USR | Can you schedule me a taxi to take me there? |
| SYS | I can book you a taxi, can you tell me the arrival or departure time? |
| USR | Also, I need a hotel with parking and 2 stars. |
| Gold States | (taxi, destination, The place), (hotel, parking, yes), (hotel, stars, 2), (attraction, type, nightclub), (attraction, area, south) |
| TRADE | (hotel, type, hotel), (hotel, parking, yes), (hotel, stars, 2), (attraction, area, south) |
| TRADE 1% data | (hotel, stars, 4) |
| Trade 1% data w/self-supervision | (hotel, parking, yes), (hotel, stars, 2) |

According to some embodiments, the framework or model 300 is trained end-to-end using the Adam optimizer, as described in further detail in Kingma et al., "Adam: A method for stochastic optimization," In International Conference on Learning Representations (ICLR), 2015, which is incorporated by reference herein, with a batch size of 8 or 32. In some embodiments, a grid search is applied for $\alpha$ and $\beta$ in the range of 0.1 to 1, and it may be found that models are sensitive to different $\alpha$ and $\beta$. The learning rate annealing is used with a 0.2 dropout ratio. In some embodiments, all the word embeddings have 400 dimensions by concatenating 300 Glove embeddings and 100 character embeddings, as described in Pennington et al., "Glove: Global vectors for word representation," In Proceedings of the 2014 conference on empirical methods in natural language processing (EMNLP), pages 1532-1543, and Hashimoto et al., "A joint many-task model: Growing a neural network for multiple nlp tasks," arXiv preprint arXiv:1611.01587, 2016, both of which are incorporated by reference herein. In some embodiments, a greedy decoding strategy may be used for the state generator 330 of the model 300 because the slot values are usually short in length. In some examples, 20%-50% of input tokens are masked out to strengthen prediction consistency. The temperature T for sharpening can be set to 0.5 and augmentation number $N_{drop}$ is 4.

TABLE 2

Simulated Labeled Dialogs (MultiWOZ)

| | 1% | 5% | 10% | 25% | 100% |
|---|---|---|---|---|---|
| Hotel | 33 | 174 | 341 | 862 | 3381 |
| Train | 35 | 166 | 332 | 809 | 3103 |
| Attraction | 29 | 143 | 276 | 696 | 2717 |
| Restaurant | 36 | 181 | 377 | 928 | 3813 |
| Taxi | 11 | 71 | 150 | 395 | 1654 |
| Total | 84 | 421 | 842 | 2105 | 8420 |

In some embodiments, the systems and methods of the present disclosure can be tested by training the framework or model 300 with the MultiWOZ dataset. As discussed above, MultiWOZ is one of the largest existing human-human multi-domain conversational corpus spanning over seven domains. The dataset contains around 8400 multi-turn dialogues, with each dialogue averaging 13.7 turns. In these results, only 5 of the domains (hotel, train, attraction, restaurant, taxi) are used because the other two domains (hospital, police) have very few dialogues (10% compared to the others) and only exist in the training set. In total, there are 30 (domain, slot) pairs. Table 2 illustrates the number of simulated labeled dialogues on the MultiWOZ training set for five of the domains—i.e., hotel, train, attraction, restaurant, and taxi. In the Table 2, the Total number of dialogues is less than the summation of dialogues in each domain because each dialogue has multiple domains.

In some examples, the systems and methods of the present disclosure only use some of the MultiWOZ domains (hotel, train, attraction, restaurant, taxi) because the other domains (hospital, police) have very few dialogues (10% compared to others) and only exist in the training set. As shown in Table 3, MultiWOZ includes 30 (domain, slot) pairs from the selected domains. For example, for the domain of hotel, there are 10 slots for price, type, parking, stay, day, people, area, stars, internet, and name. As another example, for the domain of restaurant, there are 7 slots for food, price, area, name, time, day, and people. The numbers in the last three rows of the table indicate the number of dialogues for training (Train), development (Dev), and testing (Test) for each domain.

TABLE 3

Slot definitions for each Domain in MultiWOZ.

|  | Hotel | Train | Attraction | Restaurant | Taxi |
|---|---|---|---|---|---|
| Slots | price, type, parking, stay, day, people, area, stars, internet, name | destination, departure, day, arrive by, leave at, people | area, name, type | food, price, area, name, time, day, people | destination, departure, arrive by, Leave at |
| Train | 3381 | 3103 | 2717 | 3813 | 1654 |
| Dev | 416 | 484 | 401 | 438 | 207 |
| Test | 394 | 494 | 395 | 437 | 195 |

In the testing discussed below, a limited labeled data scenario is simulated by randomly selecting dialogues from the original corpus using a fixed random seed. The dataset statistics of each labeled ratio is shown in Table 2. For example, in 1% labeled data setting, there are 84 dialogues that across five different domains. Note that the summation of number of dialogues in each domain is more than the number of total dialogues is because each dialogue could have more than one domain. For example, the dialogue illustrated in Table 1 triggers three domains.

Performance of Self/Semi-Supervised DST Training

Semi-supervision in DST is investigated using the proposed self-supervised signals. The effectiveness of leveraging unlabeled data to boost DST performance is shown. The experimental results show that with self-supervision, in some examples, the systems and methods can improve joint goal accuracy of 1% labeled data by 8.95%. An additional 1.76% improvement can be observed if some unlabeled data is included as a regularization term to perform semi-supervised training.

The performance of the systems and methods to implement or provide learning dialogue state tracking (DST) with limited labeled data, as applied to multi-domain DST, may be evaluated, for example, with joint goal accuracy and its fuzzy matching. The joint goal accuracy compares the predicted dialogue states to the ground truth $B_t$ at each dialogue turn t, and the output is considered correct if and only if all the (domain, slot, value) tuples exactly match the ground truth values in $B_t$, which can be a strict metric. The fuzzy joint goal accuracy is used to reward partial matches with the ground truth. For example, two similar values "Palo Alto" and "Palo Alto city have a fuzzy score of 0.78.

TABLE 4

Joint goal accuracy using MultiWOZ data set. (Self-Supervision)

|  |  | 1% | 5% | 10% | 25% |
|---|---|---|---|---|---|
| Base Model |  | 9.70 (11.74) | 21.85 (24.13) | 34.07 (37.42) | 41.41 (44.01) |
| Encoder | +NRG | 12.16 (13.93) | 30.73 (34.36) | 36.83 (40.12) | 41.53 (44.12) |
| Based | +TUG | 9.69 (11.70) | 24.40 (27.26) | 34.73 (37.76) | 41.60 (44.00) |
|  | +NRG + TUG | 11.87 (13.98) | 23.53 (26.02) | 34.72 (38.16) | 42.43 (45.04) |
| Generator | +NRG | 19.35 (22.03) | 30.22 (33.75) | 35.98 (39.62) | 41.87 (44.49) |
| Based | +TUG | 19.72 (22.45) | 30.47 (33.91) | 36.37 (39.74) | 42.34 (44.87) |
|  | +NRG + TUG | 18.31 (20.59) | 31.13 (34.38) | 36.90 (40.70) | 42.48 (45.12) |
| Consistency | +GC | 13.63 (15.51) | 29.11 (32.45) | 36.01 (39.38) | 42.05 (45.08) |
|  | +AC | 11.70 (13.39) | 30.35 (34.16) | 35.26 (38.30) | 41.67 (44.61) |
|  | +GC + AC | 14.22 (15.77) | 30.18 (33.59) | 36.14 (39.03) | 41.38 (44.33) |
| Generator-Based | +NRG_TUG + GC + AC | 18.65 (21.21) | 31.61 (35.67) | 37.05 (40.29) | 42.71 (45.21) |
| +Unlabeled Data |  | 20.41 (23.0) | 33.67 (37.82) | 37.16 (40.65) | 42.69 (45.14) |

TABLE 5

Joint goal accuracy using MutliWOZ data set (Semi-Supervision)

|  |  | 1% | 5% | 10% | 25% |
|---|---|---|---|---|---|
| Base Model |  | 9.70 (11.74) | 21.85 (24.13) | 34.07 (37.42) | 41.41 (44.01) |
| Encoder | +NRG | 12.12 (13.35) | 26.38 (29.07) | 35.20 (38.35) | 42.63 (44.88) |
| Based | +TUG | 12.33 (14.22) | 22.49 (25.58) | 28.19 (30.70) | 40.25 (43.01) |
|  | +NRG + TUG | 11.97 (13.83) | 29.36 (31.52) | 31.70 (35.89) | 41.79 (44.49) |
| Generator | +NRG | 19.45 (22.07) | 32.21 (35.98) | 36.71 (40.21) | 43.35 (45.78) |
| Based | +TUG | 19.62 (22.31) | 32.16 (35.88) | 36.25 (39.85) | 41.87 (44.26) |
|  | +NRG + TUG | 19.72 (22.56) | 32.50 (36.51) | 37.22 (40.69) | 42.01 (44.67) |
| Consistency | +GC | 14.05 (15.80) | 29.10 (32.32) | 33.99 (37.01) | 42.76 (45.64) |
|  | +AC | 10.31 (12.18) | 29.07 (32.25) | 35.76 (38.49) | 41.40 (44.23) |
| Generator-Based | +NRG_TUG + GC + AC | 20.41 (23.0) | 33.67 (37.82) | 37.16 (40.65) | 42.10 (44.92) |

TABLE 6

| Joint goal accuracy using MultiWOZ −2.1 data set | | | | | |
|---|---|---|---|---|---|
| | | 1% | 5% | 10% | 25% |
| Base Model | | 10.35 (12.58) | 27.70 (31.17) | 32.61 (36.18) | 38.46 (42.71) |
| Generator | +NRG | 17.96 (20.25) | 29.56 (33.75) | 34.05 (37.53) | 39.52 (42.55) |
| Based | +TUG | 17.26 (20.26) | 28.74 (32.99) | 34.42 (38.29) | 40.13 (43.04) |
| | +NRG + TUG | 18.69 (22.10) | 29.95 (34.30) | 34.57 (38.43) | 39.42 (42.45) |
| Consistency | +GC | 13.77 (15.58) | 27.55 (31.39) | 33.64 (37.40) | 40.06 (43.45) |
| | +AC | 12.06 (13.43) | 27.09 (31.04) | 33.80 (37.24) | 39.15 (42.52) |
| Generator-Based | +NRG_TUG + GC + AC | 19.50 (21.90) | 30.59 (35.13) | 34.50 (38.12) | 40.15 (43.40) |

Tables 4, 5, and 6 illustrate joint goal accuracy under various conditions. Table 4 illustrates the joint goal accuracy (and its fuzzy matching version in parentheses) on the MultiWoz data test set with 1% to 25% training data using various implementations or embodiments, including the encoder-based, generator-based, and consistent approaches as described above. The first row of Table 4 illustrates the original TRADE performance using different labeled data ratios without self-supervision. As is illustrated, generator-based strategies achieve higher joint goal accuracy, which surpasses model without self-supervised learning by far. The last two rows of Table 4 are the generator-based results using all proposed self-supervised signals with and without semi-supervision. In particular, the test results illustrate self-supervised results for embodiments using NRG only, embodiments using TUG only, and embodiments using both NRG and TUG.

Table 5 also illustrates semi-supervised learning joint goal accuracy (and its fuzzy matching version in parentheses) on the Multi-WOZ test set from 1% to 25% training data. The test results are using only NRG, only TUG, and using both. The last row is the best performance that was achieved when including data consistency regulation. Table 6 illustrates semi-supervised learning joint goal accuracy (and its fuzzy matching version in parentheses) using the MultiWOZ-2.1 data set from 1% to 25% training data. The MultiWOZ-2.1 data set is a refined version of the Multi-WOZ data set described in Mihail Eric, Rahul Goel, Shachi Paul, Abhishek Sethi, Sanchit Agarwal, Shuyag Gao, and Dilek Hakkani-Tur, "Multiwoz 2.1: Multi-domain dialogue state corrections and state tracking baselines," arXiv preprint arXiv:1907.01669 (2019).

Experimental results show that by exploiting self-supervision, the systems and methods of the present disclosure can significantly boost the joint goal accuracy with limited labeled data. As illustrated in Table 4, each self-supervision signal that is added is useful to some degree, especially for 1% and 5% labeled data. It is also apparent that self-supervision becomes less dominant and less effective as the number of labeled data increases. However, a test with 100% labeled data with self-supervision exhibited a slight improvement in the joint goal accuracy data.

As further illustrated in Table 4, for example, it can be concluded that the generator-based approach works better than encoder-based approach with limited labeled data. For example, the joint goal accuracy can be improved from 9.7% to 19.72% with 1% labeled data, and from 21.85% to 31.13% with 5% labeled data. Encoder-based strategy works better with NRG objective and TUG help generator-based more than NRG. In addition, strengthening prediction consistency has around 2% to 5% joint goal accuracy improvement. As illustrated in Table 4, by combining GC and AC, we can improve joint goal accuracy to 14.22% with 1% labeled data.

The last two rows in Table 4 illustrate the performance achieved by combining all the self-supervised signals using a generator-based strategy. Jointly modeling conversational behavior and prediction consistency results in achievement of 18.65% and 31.61% joint goal accuracy for 1% and 5% labeled data, respectively. The last row in Table 4 is the result of incorporating unlabeled data as semi-supervision. The remaining dialogues in the dataset are used as unlabeled data, e.g., 1% with 99% and 5% with 95%. As shown, with semi-supervised signals, the performance can be boosted by 1.76% and 2.06% for 1% and 5% labeled data, respectively. The semi-supervised ablation results are illustrated below with respect to FIGS. 14A and 14B. Similar results are illustrated in the data of Table 5 and Table 6.

Analysis and Visualization

Flow self-supervised signals help to learn better DST performance can be interpreted, i.e., why aligning slot contextual representations (generation-based) can improve the most? The first interesting observation is that the key improvement comes from the slot-dependent context vectors $C_{ij}$. If the context vector $C_{ij}$ is removed from Eq (7), the performance with 1% labeled data drops from 19.72% as illustrated in Table 4 to 11.07%.

Slot Gate and Attention

Context vectors are the weighted-sum of encoder hidden states, which means they have a high correlation with learned attention distributions. Also, context vectors are used to predict slot gates. Therefore, using self-supervision to align slot contextual vectors may help get better attention distributions and better slot gate prediction. As shown in Table 7, gate accuracy on 1% labeled data improves around 3% with self-supervision. We also compare attention distributions of models training with 1% labeled data and 100% labeled data and find that the base model has a smaller KL divergence value with self-supervision, i.e., the attention distribution becomes more similar to the one learned from 100% labeled data, which is assumed to be a better attention distribution.

TABLE 7

| Gate Accuracy and KL Divergence | | |
|---|---|---|
| | Gate Acc (↑) | Attention KL (↓) |
| 100% Data | 97.61 | |
| 1% Data w/o Self | 91.38 | 10.58 |
| 1% Data w/Self | 94.30 | 6.19 |

Two thousand (2,000) dialogue turns are randomly picked on the test set to compute the correlation between learned latent states ($h_{init}$) using 1% labeled data and the true status of (domain, slot) pairs (G). The model trained with self-supervision is found to have a higher Pearson correlation coefficient than the one without, increasing from $\rho=0.4315$ to $\rho=0.7035$ as is illustrated in FIGS. 14A and 14B, respectively, which is further discussed below. This implies that with self-supervision models can learn better state representations.

FIGS. 14A and 14B illustrate ablation results of each self-supervised signals with semi-supervision. The correlation on the test set between latent dialogue states and true dialogue states on 1% labeled data is presented. The X-axis is the cosine similarity score between each learned state representation and the y-axis is the cosine similarity score between each true slot gate status. Ideally, when the slot gate status is similar (score is close to 1), then the learned representations should also have a high similarity score. As is illustrated, training with self-supervision exhibits a higher Pearson correlation coefficient, $\rho=0.7035$.

The attention distributions of a dialogue history such as that described above is illustrated in FIGS. 8A, 8B, and 8C. FIG. 8A illustrates an attention distribution with 100% data labeling. FIG. 8B is an attention distribution 1% data labeling but without self-supervision. FIG. 8C is an attention distribution with 1% data labeling with self-supervision. The thicker line on the blocks means the higher attention weight and the higher copy probability. The 1% labeled data model with self-supervision learns an attention distribution more similar to the one using 100% labeled data. For example, as shown in FIGS. 8A and 8C, both of them focus on some useful slot information such as "Cambridge", "London", "Saturday", and "18:45". More attention visualizations using the MultiWOZ-2.1 data set are illustrated in FIGS. 9A, 9B, 9C, FIGS. 10A, 10B, and 10C, FIG. 11, and FIG. 12, which provide further illustrations of embodiments of the present disclosure. As is illustrated, each of these examples illustrates that the 1% labeled data model with self-supervision learns an attention distribution more similar to the one using 100% labeled data.

Slot Accuracy Analysis

Figure 13:
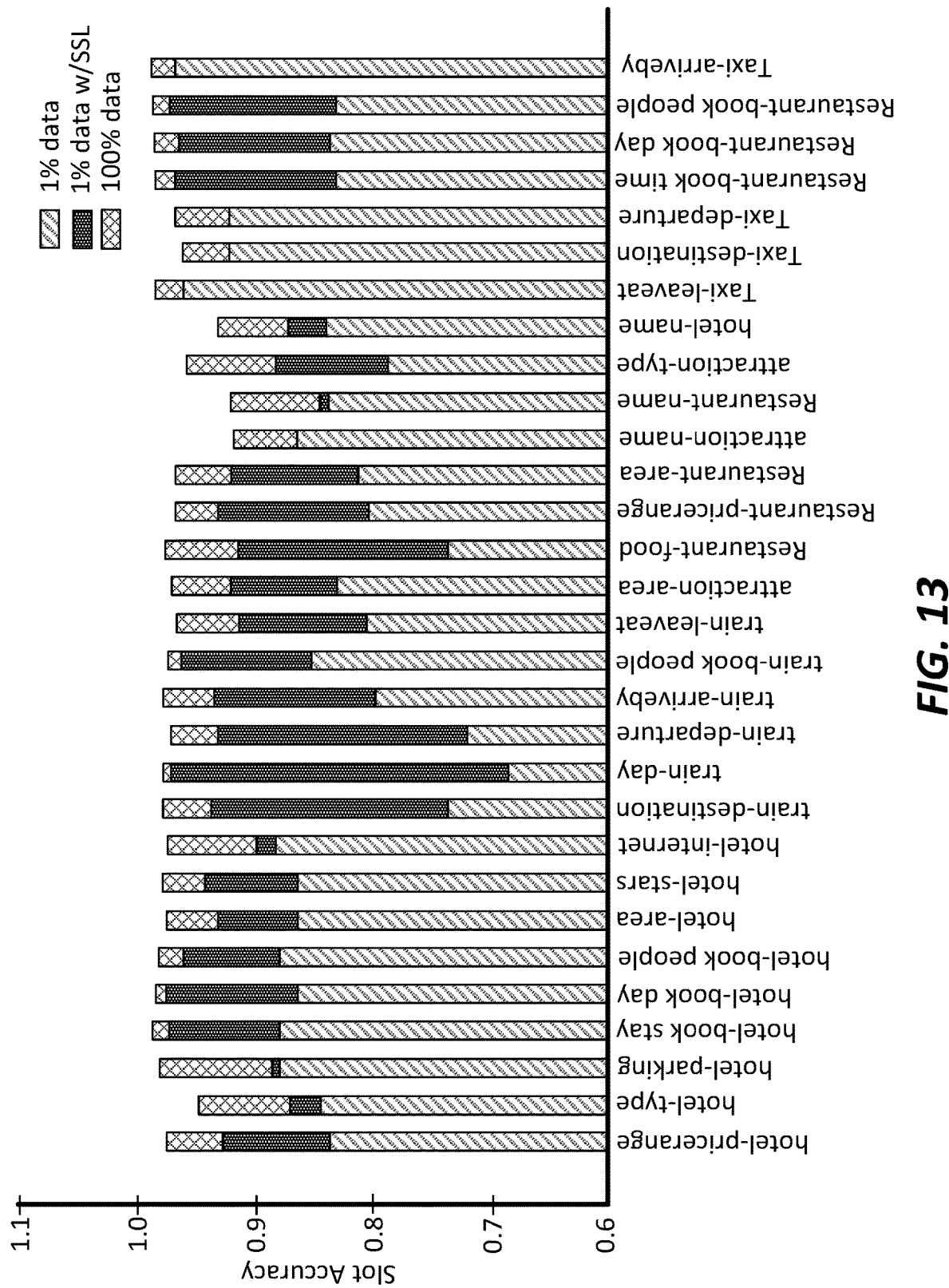
FIG. 13 illustrates a slot accuracy visualization for (domain, slot) pairs.

FIG. 13 provides a slot accuracy visualization for each (domain, slot) pairs. As illustrated in FIG. 13 visually illustrates the comparison between using 100% data and using 1% data with and without self-supervised labeling. In particular, each bar of FIG. 13 overlays the 100% slot accuracy (which is generally the highest), the bar showing 1% labeled data with self-supervised labeling is overlayed on the bar showing 100% slot accuracy, and the bar showing 1% labeled data without self-supervised labeling is over-layed on the other two bars. The diagonally hatched bar is the performance of 1% labeled data without self-supervision, the dot-filled bar is the improvement by using self-supervision, and the cross-hatched bar can be viewed as the upper-bound of the base model using 100% labeled data. FIG. 13 thus illustrates which domains and which slots are easier to be self-supervised learned. As shown in FIG. 13, the x-axis is each (domain, slot) pair and the y-axis is its slot accuracy (at each dialogue turn whether the pair is predicted correctly).

The top three (domain, slot) pairs that are most effective with self-supervision are (train, day), and (train, departure), (train, destination). On the other hand, self-supervision appears to be less helpful to pairs such as (hotel, parking), (hotel, internet), (restaurant, name), and all the pairs in the taxi domain. One possible reason is that self-supervision is sensitive to the unlabeled data size, i.e., the major domain is dominant in the overall performance. It is worth mentioning that in the taxi domain, all the slots perform relatively well with 1% labeled data. This could also explain why the zero-shot performance (the ability to solve a task without receiving any example of that task at the training stage) reported in Wu et al. (Chien-Sheng Wu, Andrea Madotto, Ehsan Hosseini-Asl, Caiming Xiong, Richard Socher, and Pascale Fung, "Transferable multi-domain state generator for task-oriented dialogue systems," Proceedings of the 57th Annual Meeting of the Association for Computational Linguistics, pages 808-819, Florence, Italy, Association for Computational Linguistics (2019)) is much better in the taxi domain than the other four domains.

Embodiments described in this disclosure illustrate the use of self-/semi-supervised approaches for label-efficient DST in task-oriented dialogue systems. Conversational behavior is modeled by next response generation and turn utterance generation tasks. Prediction consistency is strengthened by augmenting data with stochastic word dropout and label guessing. Experimental results show that by exploiting self-supervision the joint goal accuracy can be boosted with limited labeled data.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for self-supervised training of a dialogue state tracking (DST) module, the method comprising:
 receiving, from a database, a first input of unlabeled dialogue data including a time sequence of dialogue pairs, each dialogue pair including a respective unlabeled user utterance and a respective unlabeled system response;

generating, via the DST module, a predicted system response subsequent to a first dialogue pair based on a first set of dialogue pairs that occur by and include the first dialogue pair in the time sequence of dialogue pairs and a predicted dialogue state from the first dialogue pair;

generating, via the DST module, a predicted user utterance corresponding to the first dialogue pair based on a second set of dialogue pairs that occur prior to the first dialogue pair in the time sequence of dialogue pairs and the predicted dialogue state from the first dialogue pair;

computing an unsupervised loss metric based on the predicted system response and the generated user utterance for the first dialogue pair; and updating the DST module based on the unsupervised loss metric.

2. The method of claim 1, wherein the predicted system response is generated, at a first dialogue turn associated with the first dialogue pair, as a conditional probability distribution of the predicted system response for a subsequent dialogue turn conditioned on the first set of dialogue pairs and the predicted dialogue state inferred from the first dialogue pair at the first dialogue turn.

3. The method of claim 1, wherein the predicted user utterance is generated, at a first dialogue turn associated with the first dialogue pair, as a conditional probability distribution of the predicted current user utterance for the first dialogue turn conditioned on the second set of dialogue pairs and the predicted dialogue state inferred from the first dialogue pair at the first dialogue turn.

4. The method of claim 1, wherein the predicted system response or the predicted user utterance is generated by a gated recurrent unit initialized by information from a context encoder that encodes the first input of unlabeled dialogue data.

5. The method of claim 4, wherein the gated recurrent unit receives a state corresponding to a last hidden layer of the context encoder as an initial state.

6. The method of claim 1, wherein the predicted system response or the predicted user utterance is generated by a gated recurrent unit initialized by information from a state generator that generates state information for each dialogue pair in the time sequence of the dialogue pairs.

7. The method of claim 6, wherein the gated recurrent unit receives hidden states of the state generator queried by each domain-slot pair and a respective context vector corresponding to the respective domain-slot pair, and generates each output word conditioned on the hidden states of the context encoder.

8. The method of claim 1, wherein the unsupervised loss metric is computed as a sum of a first cross entropy between the predicted system response and an actual system response from a second dialogue pair subsequent to the first dialogue pair, and a second cross entropy between the generated user utterance and an actual user utterance from the first dialogue pair.

9. The method of claim 1, further comprising:
receiving a second input of labeled dialogue data;
computing a supervised loss metric for the DST module from the second input of labeled dialogue data;
computing the unsupervised loss metric for the DST module from the second input of labeled dialogue data but without dialogue labels;
computing a weighted sum of the supervised loss metric and the unsupervised metric; and updating the DST module based on the weighted sum of the supervised loss metric and the unsupervised loss metric.

10. The method of claim 9, further comprising:
alternately training the DST module by:
using the weighted sum of the supervised loss metric and the unsupervised loss metric derived from labeled dialogue data; and
using the unsupervised loss metric derived from unlabeled dialogue data.

11. A system for self-supervised training of a dialogue state tracking (DST) module, the method comprising:
a memory storing instructions for self-supervised training of the DST module; and
a processor configured to read and execute the instructions from the memory to:
receive, from a database, a first input of unlabeled dialogue data including a time sequence of dialogue pairs, each dialogue pair including a respective unlabeled user utterance and a respective unlabeled system response;

generate, via the DST module, a predicted system response subsequent to a first dialogue pair based on a first set of dialogue pairs that occur by and include the first dialogue pair in the time sequence of dialogue pairs and a predicted dialogue state from the first dialogue pair;

generate, via the DST module, a predicted user utterance corresponding to the first dialogue pair based on a second set of dialogue pairs that occur prior to the first dialogue pair in the time sequence of dialogue pairs and the predicted dialogue state from the first dialogue pair;

compute an unsupervised loss metric based on the predicted system response and the generated user utterance for the first dialogue pair; and update the DST module based on the unsupervised loss metric.

12. The system of claim 11, wherein the predicted system response is generated, at a first dialogue turn associated with the first dialogue pair, as a conditional probability distribution of the predicted system response for a subsequent dialogue turn conditioned on the first set of dialogue pairs and the predicted dialogue state inferred from the first dialogue pair at the first dialogue turn.

13. The system of claim 11, wherein the predicted user utterance is generated, at a first dialogue turn associated with the first dialogue pair, as a conditional probability distribution of the predicted current user utterance for the first dialogue turn conditioned on the second set of dialogue pairs and the predicted dialogue state inferred from the first dialogue pair at the first dialogue turn.

14. The system of claim 11, wherein the predicted system response or the predicted user utterance is generated by a gated recurrent unit initialized by information from a context encoder that encodes the first input of unlabeled dialogue data.

15. The system of claim 14, wherein the gated recurrent unit receives a state corresponding to a last hidden layer of the context encoder as an initial state.

16. The system of claim 11, wherein the predicted system response or the predicted user utterance is generated by a gated recurrent unit initialized by information from a state generator that generates state information for each dialogue pair in the time sequence of the dialogue pairs.

17. The system of claim 16, wherein the gated recurrent unit receives hidden states of the state generator queried by each domain-slot pair and a respective context vector corresponding to the respective domain-slot pair, and generates each output word conditioned on the hidden states of the context encoder.

18. The system of claim 11, wherein the unsupervised loss metric is computed as a sum of a first cross entropy between the predicted system response and an actual system response from a second dialogue pair subsequent to the first dialogue pair, and a second cross entropy between the generated user utterance and an actual user utterance from the first dialogue pair.

19. The system of claim 11, wherein the processor is further configured to read and execute the instructions from the memory to:
receive a second input of labeled dialogue data;
compute a supervised loss metric for the DST module from the second input of labeled dialogue data;
compute the unsupervised loss metric for the DST module from the second input of labeled dialogue data but without dialogue labels;
compute a weighted sum of the supervised loss metric and the unsupervised metric;
update the DST module based on the weighted sum of the supervised loss metric and the unsupervised loss metric; and
alternately train the DST module by:
using the weighted sum of the supervised loss metric and the unsupervised loss metric derived from labeled dialogue data; and
using the unsupervised loss metric derived from unlabeled dialogue data.

20. A non-transitory processor-readable storage medium storing processor-executable instructions for self-supervised training of a dialogue state tracking (DST) module, the instructions being executed by a processor to:
receive, from a database, a first input of unlabeled dialogue data including a time sequence of dialogue pairs, each dialogue pair including a respective unlabeled user utterance and a respective unlabeled system response;
generate, via the DST module, a predicted system response subsequent to a first dialogue pair based on a first set of dialogue pairs that occur by and include the first dialogue pair in the time sequence of dialogue pairs and a predicted dialogue state from the first dialogue pair;
generate, via the DST module, a predicted user utterance corresponding to the first dialogue pair based on a second set of dialogue pairs that occur prior to the first dialogue pair in the time sequence of dialogue pairs and the predicted dialogue state from the first dialogue pair;
compute an unsupervised loss metric based on the predicted system response and the generated user utterance for the first dialogue pair; and
update the DST module based on the unsupervised loss metric.

* * * * *